(12) United States Patent
Matsuno

(10) Patent No.: US 11,375,153 B2
(45) Date of Patent: Jun. 28, 2022

(54) INFORMATION PROCESSING DEVICE AND INFORMATION PROCESSING METHOD

(71) Applicant: SONY CORPORATION, Tokyo (JP)

(72) Inventor: Koichi Matsuno, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/613,519

(22) PCT Filed: May 15, 2018

(86) PCT No.: PCT/JP2018/018649
§ 371 (c)(1),
(2) Date: Nov. 14, 2019

(87) PCT Pub. No.: WO2018/216538
PCT Pub. Date: Nov. 29, 2018

(65) Prior Publication Data
US 2020/0084412 A1 Mar. 12, 2020

(30) Foreign Application Priority Data
May 23, 2017 (JP) .............................. JP2017-101633

(51) Int. Cl.
*H04N 7/08* (2006.01)
*H04N 5/232* (2006.01)
(Continued)

(52) U.S. Cl.
CPC ....... *H04N 7/0806* (2013.01); *H04N 5/23235* (2013.01); *H04N 7/0117* (2013.01); *H04N 7/025* (2013.01); *H04N 7/12* (2013.01)

(58) Field of Classification Search
CPC ............. H04N 7/0806; H04N 5/23235; H04N 7/0117; H04N 7/025; H04N 7/12; H04N 5/232; H04N 21/2343; G06F 13/00
See application file for complete search history.

(56) References Cited

U.S. PATENT DOCUMENTS 6,137,534 A * 10/2000 Anderson .......... H04N 1/00453
348/222.1
7,725,431 B2 * 5/2010 Myllyla ................ G06F 16/273
707/610
(Continued)

FOREIGN PATENT DOCUMENTS

CN 1885835 A 12/2006
EP 1737171 A1 12/2006
(Continued)

OTHER PUBLICATIONS

International Search Report and Written Opinion of PCT Application No. PCT/JP2018/018649, dated Jun. 19, 2018, 10 pages of ISRWO.
(Continued)

*Primary Examiner* — Gevell V Selby
(74) *Attorney, Agent, or Firm* — Chip Law Group

(57) ABSTRACT

The present invention relates to an information processing device configured to perform a process of creating, on the basis of original content, at least a first content having a data size smaller than a data size of the original content and a second content having a data size smaller than the data size of the first content, and a process of transferring the original content, the first content, and/or the second content.

14 Claims, 15 Drawing Sheets

(51) Int. Cl.
*H04N 7/01* (2006.01)
*H04N 7/025* (2006.01)
*H04N 7/12* (2006.01)

(56) References Cited

U.S. PATENT DOCUMENTS

| | | | |
|---|---|---|---|
| 8,368,815 B2* | 2/2013 | Tsurumi | G06K 9/00335 348/699 |
| 2002/0065844 A1* | 5/2002 | Robinson | H04N 1/00132 715/201 |
| 2003/0161010 A1 | 8/2003 | Schinner | |
| 2005/0231610 A1* | 10/2005 | Anderson | H04N 1/2166 348/222.1 |
| 2006/0290997 A1 | 12/2006 | Okada et al. | |
| 2007/0136661 A1 | 6/2007 | Park et al. | |
| 2010/0153864 A1 | 6/2010 | Park et al. | |
| 2011/0221912 A1* | 9/2011 | Yoshizawa | H04N 1/32112 348/207.99 |
| 2015/0341559 A1* | 11/2015 | Kelder | H04N 5/23245 348/220.1 |
| 2017/0109864 A1 | 4/2017 | Ohba et al. | |

FOREIGN PATENT DOCUMENTS

| | | |
|---|---|---|
| JP | 2003-289502 A | 10/2003 |
| JP | 2006-080860 A | 3/2006 |
| JP | 2006-173854 A | 6/2006 |
| JP | 4504260 B2 | 7/2010 |
| JP | 2011-114761 A | 6/2011 |
| JP | 4914378 B2 | 4/2012 |
| JP | 2013-201704 A | 10/2013 |
| JP | 2015-231103 A | 12/2015 |

OTHER PUBLICATIONS

Extended European Search Report of EP Application No. 18806062.8, dated Jul. 15, 2020, 08 pages.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/018649 filed on May 15, 2018, which claims priority benefit of Japanese Patent Application No. JP 2017-101633 filed in the Japan Patent Office on May 23, 2017. Each of the above-referenced applications is hereby incorporated herein by reference in its entirety.

TECHNICAL FIELD

The present technology relates to an information processing device, an information processing method, and information processing program.

BACKGROUND ART

In recent years, with the spread of image sharing sites on the Internet, images are transferred from imaging devices such as digital cameras to terminal devices such as smartphones connected to the Internet, and uploaded from the terminal devices to image sharing sites.

For such and other purposes of use, various proposals have been made for transferring image data from a digital camera that has captured an image to a host device such as a personal computer (Patent Document 1).

CITATION LIST

Patent Document

Patent Document 1: Japanese Patent No. 4914378

SUMMARY OF THE INVENTION

Problems to be Solved by the Invention

However, in cases where the image quality is high and the data size is large, and where the number of images to be transmitted is large, it usually takes a long time to transfer the image data, and a user has to wait for a long time until completion of the transfer before the transferred images become available, which is disadvantageous.

The present technology has been made in view of such disadvantage, and an object thereof is to provide an information processing device, an information processing method, and an information processing program that are capable of shortening the time from start of transferring content data until the content data becomes available.

Solutions to Problems

In order to overcome the above-described disadvantage, a first technology is an information processing device configured to perform a process of creating, on the basis of original content, at least a first content having a data size smaller than a data size of the original content and a second content having a data size smaller than the data size of the first content, and a process of transferring the original content, the first content, and/or the second content.

Furthermore, a second technology is an information processing method including creating, on the basis of original content, at least a first content having a data size smaller than a data size of the original content and a second content having a data size smaller than the data size of the first content, and transferring the original content, the first content, and/or the second content.

Moreover, a third technology is an information processing program causing a computer to perform an information processing method including creating, on the basis of original content, at least a first content having a data size smaller than a data size of the original content and a second content having a data size smaller than the data size of the first content, and transferring the original content, the first content, and/or the second content.

Effects of the Invention

According to the present technology, it is possible to shorten the time from start of transferring content data until the content data becomes available. Note that the effect described here is not necessarily limited and that the effect may be any of the effects described in the specification.

MODE FOR CARRYING OUT THE INVENTION

Figure 1:
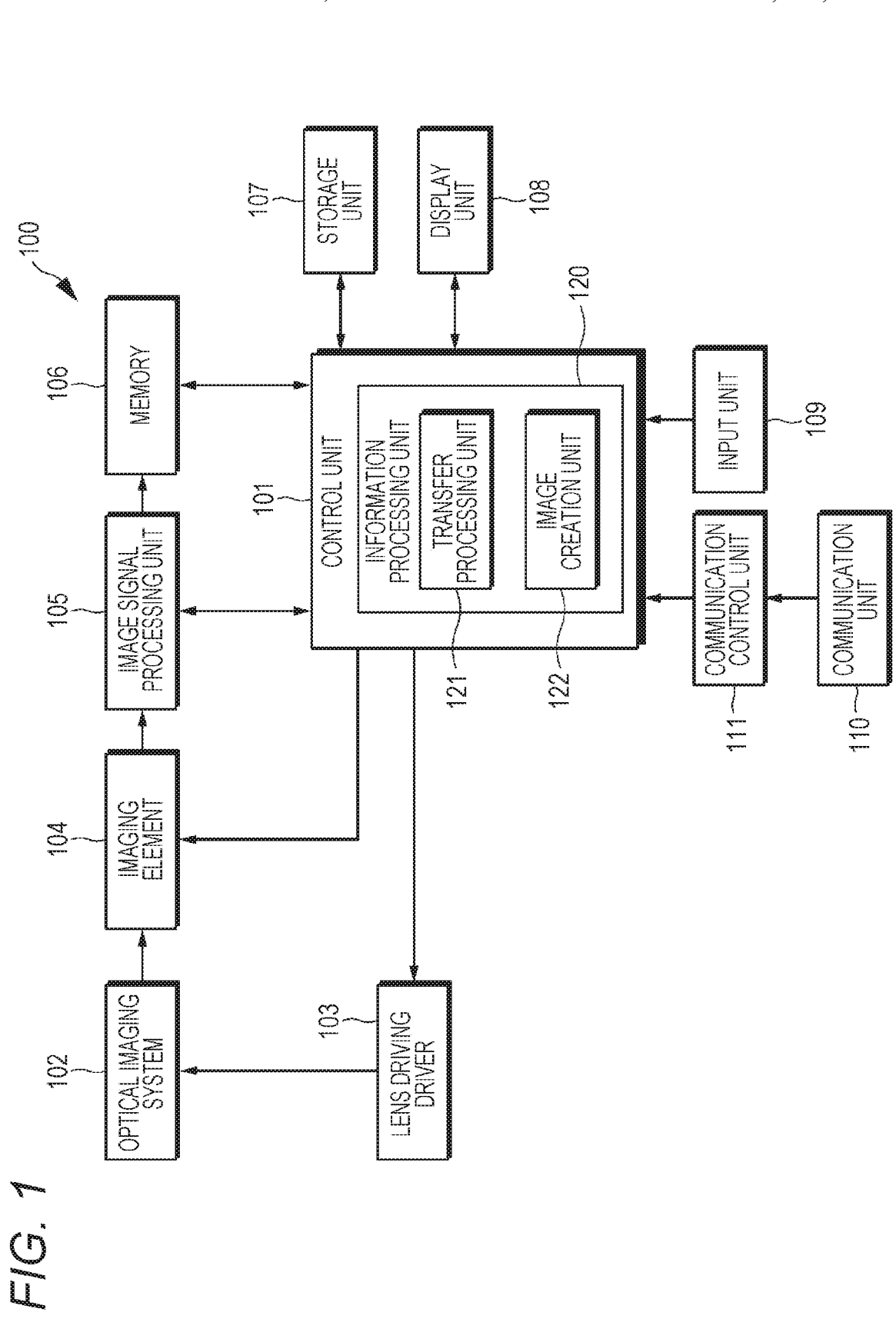
FIG. 1 is a block diagram illustrating a configuration of an imaging device.
Figure 2:
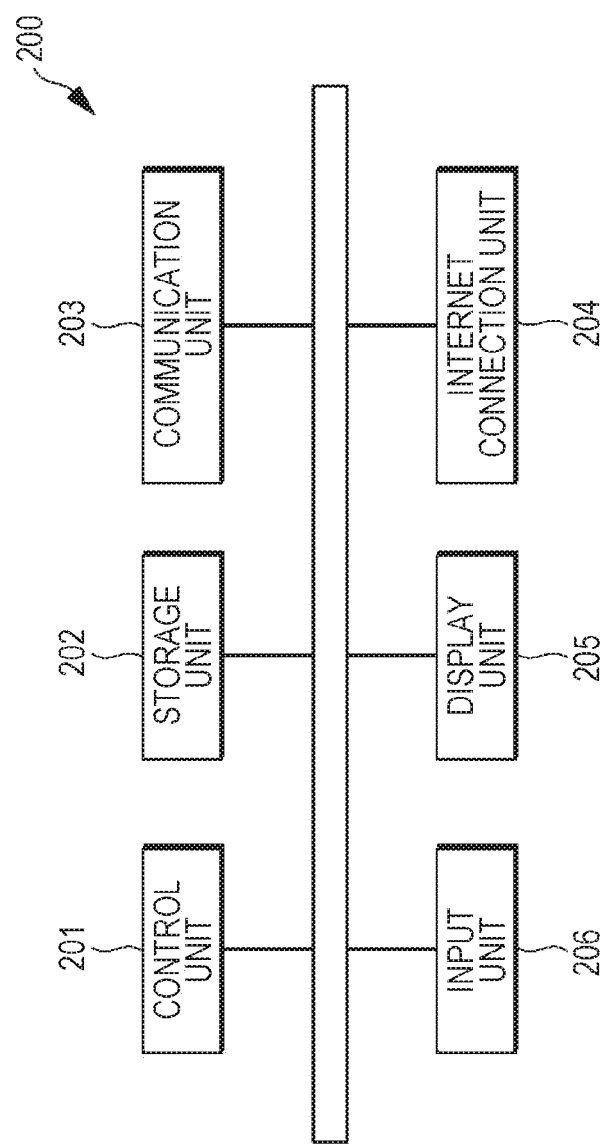
FIG. 2 is a block diagram illustrating a configuration of a terminal device.

Hereinafter, an embodiment of the present technology will be described with reference to the accompanying drawings. Note that the description will be given in the following order.

<1. Embodiment>
[1-1. Configuration of imaging device]
[1-2. Configuration of terminal device]
[1-3. Transfer process of comparative example]

[1-4. Transfer process]
[1-4-1. First aspect of transfer]
[1-4-2. Second aspect of transfer]
[1-4-3. Third aspect of transfer]
[1-4-4. Fourth aspect of transfer]
  <2. Application Examples>
  <3. Modification Examples>

1. Embodiment

[1-1. Configuration of Imaging Device]

In the present embodiment, an image, which is content captured by an imaging device 100, is transferred to a terminal device 200 and used in the terminal device 200 for various purposes of use. The image corresponds to content in the claims. The imaging device 100 corresponds to a first device in the claims, and the terminal device 200 corresponds to a second device in the claims.

The imaging device 100 includes a control unit 101, an optical imaging system 102, a lens driving driver 103, an imaging element 104, an image signal processing unit 105, a memory 106, a storage unit 107, a display unit 108, an input unit 109, a communication unit 110, a communication control unit 111, an information processing unit 120, a transfer processing unit 121, and an image creation unit 122.

The control unit 101 includes a central processing unit (CPU), a random access memory (RAM), a read only memory (ROM), and the like. Programs, which are read and operated by the CPU, and the like are stored in the ROM. The RAM is used as a work memory of the CPU. The CPU controls the entire imaging device 100 by executing various processes and issuing commands according to the program stored in the ROM.

The optical imaging system 102 includes an imaging lens for condensing light from a subject onto the imaging element 104, a driving mechanism for moving an imaging lens to perform focusing and zooming, a shutter mechanism, an iris mechanism, and the like. These are driven on the basis of control signals received from the control unit 101 and the lens driving driver 103 of the body of the imaging device 100. An optical image of a subject obtained through the optical imaging system 102 is formed on the imaging element 104 included in the body of the imaging device 100.

The lens driving driver 103, which includes, for example, a micro-computer or the like, moves the imaging lens a predetermined amount in an optical axis direction under the control of the control unit 101 of the body of the imaging device 100 to perform auto-focusing to focus on a target subject. Furthermore, under the control of the control unit 101, operations of the drive mechanism, shutter mechanism, iris mechanism, and the like of the optical imaging system 102 are controlled. With this configuration, exposure time (shutter speed) is adjusted, and an aperture value (F-number) and the like are adjusted.

The imaging element 104 photoelectrically converts incident light from a subject into an electric charge and outputs a pixel signal. The imaging element 104 then outputs the pixel signal to a camera processing circuit. As the imaging element 104, a charge coupled device (CCD), a complementary metal oxide semiconductor (CMOS), or the like is used.

The image signal processing unit 105 subjects the imaging signal output from the imaging element 104 to a sample-and-hold process for maintaining a favorable signal/noise (S/N) ratio by a correlated double sampling (CDS) process, an auto gain control (AGC) process, analog/digital (A/D) conversion, and the like to create an image signal.

In addition, the image signal processing unit 105 may also subject the image signal to a predetermined signal process such as a demosaicing process, a white balance adjustment process or a color correction process, a gamma correction process, a Y/C conversion process, an auto exposure (AE) process, and a resolution conversion process.

The memory 106 is a buffer memory including a volatile memory, such as a dynamic random access memory (DRAM). The memory 106 temporarily stores image data subjected to the predetermined processes by the image signal processing unit 105.

The storage unit 107 is, for example, a large-capacity storage medium such as a hard disk or an SD memory card. Still images and moving images captured by the imaging device 100 are stored in the storage unit 107. The moving images are stored in a format of moving picture experts group 2 (MPEG2) or MPEG4, for example. Furthermore, exchangeable image file format (EXIF) data including additional information such as information regarding the stored image and a date and a time of capturing the image are also stored in association with the image.

The display unit 108 is a display device including, for example, a liquid crystal display (LCD), a plasma display panel (PDP), an organic electro luminescence (EL) panel, or the like. On the display unit 108, a user interface of the imaging device 100, a menu screen, a monitoring image currently being captured, a captured image recorded in the storage unit 107, a captured moving image recorded in the storage unit 107, and the like are displayed.

The input unit 109 is used to input an imaging instruction, various settings, and the like to the body of the imaging device 100. When a user performs an input to the input unit 109, a control signal corresponding to the input is generated and output to the control unit 101. The control unit 101 then performs arithmetic processing corresponding to the control signal and controls the imaging device 100. Examples of the input unit 109 include hardware buttons such as a release button, an image-capturing start instruction button, a power button for switching power on and power off, and an operator for zooming adjustment, and also includes a touch panel integrally formed with the display unit 108.

The communication unit 110 is a communication module that communicates with the terminal device 200 and transfers an image to the terminal device 200. Communication with the terminal device 200 may be either wired communication such as universal serial bus (USB) communication or wireless communication such as wireless local area network (LAN) communication including Wi-Fi, Bluetooth, and ZigBee.

The communication control unit 111 controls the communication unit 110, and always grasps the transfer bandwidth between the imaging device 100 and the terminal device 200 performed by the communication unit 110, and then periodically supplies the transfer bandwidth to the information processing unit 120.

The information processing unit 120 includes a transfer processing unit 121 and an image creation unit 122. Note that the information processing unit 120 is realized by a program, and the program may be preinstalled in the imaging device 100, or the program may be downloaded or distributed on a storage medium, or the like and then installed by a user himself/herself. Alternatively, the information processing unit 120 may be independent of the control unit 101. Moreover, a program is not the only way to realize the information processing unit 120, but the information processing unit 120 may also be realized by hardware, that is, a dedicated device having the function, or by combining circuits, and the like.

The transfer processing unit 121 obtains information indicating the communication bandwidth between the imaging device 100 and the terminal device 200 (hereinafter referred to as communication bandwidth information) from the communication control unit 111, and determines the number of images to be transferred (hereinafter referred to as a transfer file number) on the basis of the communication bandwidth information. The transfer file number is the total number of images having data sizes that are smaller than the data size of a captured original image (hereinafter referred to as an original image) and that are different from each other. The original image corresponds to original content in the claims. The transfer file number information is supplied to the image creation unit 122. In the present embodiment, the transfer file number is at least three.

When the original image obtained by the capturing is supplied and the transfer file number information is supplied from the transfer processing unit 121, the image creation unit 122 generates an image that is the same as the original image and has a data size smaller than the original image on the basis of the transfer file number information and the original image.

For example, a plurality of threshold values is set for the communication bandwidth, and in a case where the communication bandwidth is equal to or smaller than a first threshold value, the transfer file number is set to three. In a case where the transfer file number is three, the image creation unit 122 creates image data having a data size smaller than that of the original image (hereinafter referred to as a medium image) and an image having a data size smaller than that of the medium image (hereinafter referred to as a small image). In the present embodiment, two types of images having data sizes smaller than that of the original image are referred to as a small image and a medium image.

As a method for reducing the data size, any method may be used as long as the data size is reduced. For example, a method for reducing the image resolution, a method for reducing the image size, or a method for increasing the compression rate may be used. Note that, one of these methods may be used to reduce the data size, or these methods may be used in combination to reduce the data size.

When an image is obtained by image capturing by the imaging device 100, the obtained image may be automatically transferred to the terminal device 200. Alternatively, a user may select an image to be transferred after the image capturing, a transfer instruction may be input to the input unit 109 of the device 100, and the selected image may be transferred to the terminal device 200.

The image creation unit 122 may create an image having a small data size only for a selected image when a user selects the image to be transferred rather than creating an image having a small data size automatically when the original image and the transfer file number are supplied to the image creation unit 122.

[1-2. Configuration of Terminal Device]

Next, the terminal device 200 will be described with reference to FIG. 3. Examples of the terminal device 200 include a personal computer, a tablet terminal, a smartphone, and the like.

The terminal device 200 includes a control unit 201, a storage unit 202, a communication unit 203, an Internet connection unit 204, a display unit 205, and an input unit 206.

The control unit 201 includes a CPU, a RAM, a ROM, and the like. Programs, which are read and operated by the CPU, and the like are stored in the ROM. The RAM is used as a work memory of the CPU. The CPU executes various processes in accordance with the programs stored in the ROM and issues commands to control the entire terminal device 200.

The storage unit 202 is, for example, a large-capacity storage medium such as a hard disk or an SD memory card. The original image, the small image, and the medium image transferred from the imaging device 100 and received by the communication unit 203 are stored in the storage unit.

The communication unit 203 is a communication module for communicating with the imaging device 100 and receiving the original image, the small image, and the medium image transferred from the imaging device 100. Communication with the terminal device 200 may be either wired communication such as USB communication or wireless communication such as wireless LAN communication including Wi-Fi, Bluetooth, and ZigBee. Furthermore, the communication between the imaging device 100 and the terminal device 200 may be direct communication or communication through another network.

The Internet connection unit 204 is a communication module for connecting the terminal device 200 to the Internet. The connection method to the Internet may be any method as long as it can connect to the Internet, such as a wired LAN, a wireless LAN such as Wi-Fi, 4th generation mobile communication system (4G), and broadband.

The display unit 205 is a display device including, for example, an LCD, a PDP, an organic EL panel, or the like. On the display unit 205, a user interface of the terminal device 200, an original image, a small image, a medium image, and the like transferred from the imaging device 100 are displayed.

The input unit 206 receives an operation input to the terminal device 200 by a user. When a user performs an input to the input unit 206, a control signal corresponding to the input is generated and output to the control unit 201. The control unit 201 then performs arithmetic processing corresponding to the control signal and controls the terminal device 200. Examples of the input unit 206 include a touch panel formed integrally with the display unit 205, a pointing device called a track pad or a touch pad having a flat plate-like sensor not integrated with the display unit 205 that is operated by tracing using a finger, a keyboard, a mouse, and the like.

The imaging device 100 and the terminal device 200 are configured as described above.

[1-3. Transfer Process of Comparative Example]

Next, a transfer process using two types of images in a conventional technology as a comparative example will be described with reference to FIG. 3. In FIG. 3, the description will be made on the assumption that two types of image data having different data sizes, that is, three original images of an image A, an image B, and an image C, and small images having smaller data sizes than the original images are transferred. For the image A, image B, and image C, original image data is referred to as an original image A, an original image B, and an original image C, and small images are referred to as a small image a, a small image b, and a small image c.

Furthermore, for convenience of description, it is assumed that the data sizes of the original image A, the original image B, and the original image C are the same, and the data sizes of the small image a, the small image b, and the small image c are the same. In FIG. 3, the size of a rectangle indicating an image indicates the data size. Furthermore, it is assumed that the network between the imaging device 100 and the terminal device 200 has a transfer bandwidth allowing simultaneous transmission of three small images.

Figure 3:
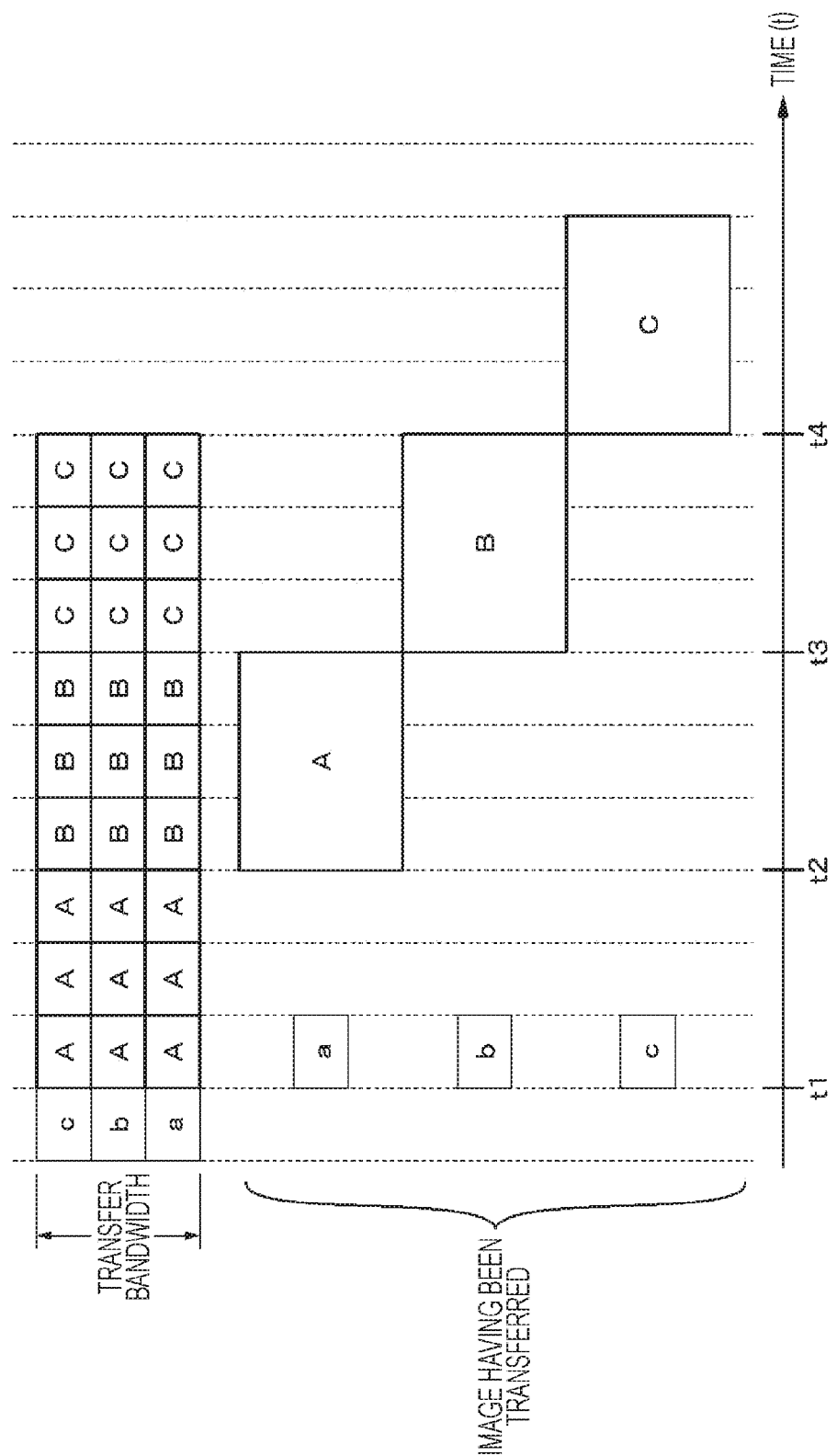
FIG. 3 is a diagram illustrating a transfer process according to a conventional technology as a comparative example.

In FIG. 3, the time axis advances from left to right, the upper part illustrates transfer bandwidth of images between the imaging device 100 and the terminal device 200, and the lower part illustrates images that have been transmitted and become available in the terminal device 200.

In the conventional technology, first, transfer of the small image a, the small image b, and the small image c from the imaging device 100 to the terminal device 200 is started at the same time. Then, at time t1, the transfer is completed and the small image a, the small image b, and the small image c become available in the terminal device 200.

Following the transfer of the small image a, the small image b, and the small image c, transfer of the original image A, the original image B, and the original image C is started. Since the transfer bandwidth of the network between the imaging device 100 and the terminal device 200 does not allow simultaneous transmission of a plurality of original images, the original image A and a medium image c' are transferred in this order.

Then, at time t2, the transfer of the original image A is completed and the original image A becomes available in the terminal device 200. Furthermore, at time t3, the transfer of the original image B is completed and the original image B becomes available in the terminal device 200. Moreover, at time t4, the transfer of the original image C is completed and the original image C becomes available in the terminal device 200.

In the conventional technology, an original image and one image having a data size smaller than that of the original image are created and the two types of images are transferred as described above. Images having small data sizes are mainly used for thumbnail display, etc., and are difficult to be used for the purpose of uploading to SNS, sending to friends, printing, image processing, etc. due to small image size and low resolution. Therefore, in order to use an image for these purposes, it is necessary to wait for the transfer of the original image to be completed, impairing immediacy.

[1-4. Transfer Process]

[1-4-1. First Aspect of Transfer]

Next, with reference to FIG. 4, a first aspect of a transfer process in the present embodiment will be described.

The following first aspect of the present technology will be described by taking as an example a case where three images of an image A, an image B, and an image C are transferred. In the case where the three images of the image A, the image B, and the image C are transferred, a medium image and a small image that are two types of image data having different data sizes are created for each of the image A, the image B, and the image C. For the image A, the image B, and the image C, original images are referred to as an original image A, an original image B, and an original image C, medium images are referred to as a medium image a', a medium image b', and a medium image c', and small images are referred to as a small image a, a small image b, and a small image c. The medium image corresponds to a first image in the claims, and the small image corresponds to a second image in the claims.

For convenience of explanation, it is assumed that the data sizes of the original image A, the original image B, and the original image C are the same, the data sizes of the medium image a', the medium image b', and the medium image c' are the same, and the data sizes of the small image a, the small image b, and the small image c are the same. Moreover, it is assumed that the network between the imaging device 100 and the terminal device 200 has a transfer bandwidth, which is always constant and which allows simultaneous transmission of the small image a, the small image b, and the small image c.

As described above, the original images are high-quality images themselves obtained by capturing, the medium images are pieces of image data having a smaller data size than the original images, and the small images are images having a smaller data size than the medium images. In the drawing for illustrating the transfer process of the present technology described below, the size of a quadrangle indicating an image indicates the data size similarly to FIG. 3.

The small image is an image mainly used for, for example, thumbnail display, etc. in the terminal device 200. For a purpose of use such as thumbnail display, etc., high resolution and a large image size are not required, and it is sufficient if a user can recognize what is on the image when the user looks at the image. Therefore, the data size can be reduced by reducing the resolution of the image or reducing the image size.

Furthermore, the medium image is not required to have a resolution as high as the original image or an image size as large as the original image, but it has a larger data size than the small image so that the medium image can be used for purposes of uploading to an SNS site or photo sharing site on the Internet, sending to friends, or using for image processing. Note that, the data sizes are not limited as long as a medium image has a data size larger than that of a small image and smaller than that of an original image.

Figure 4:
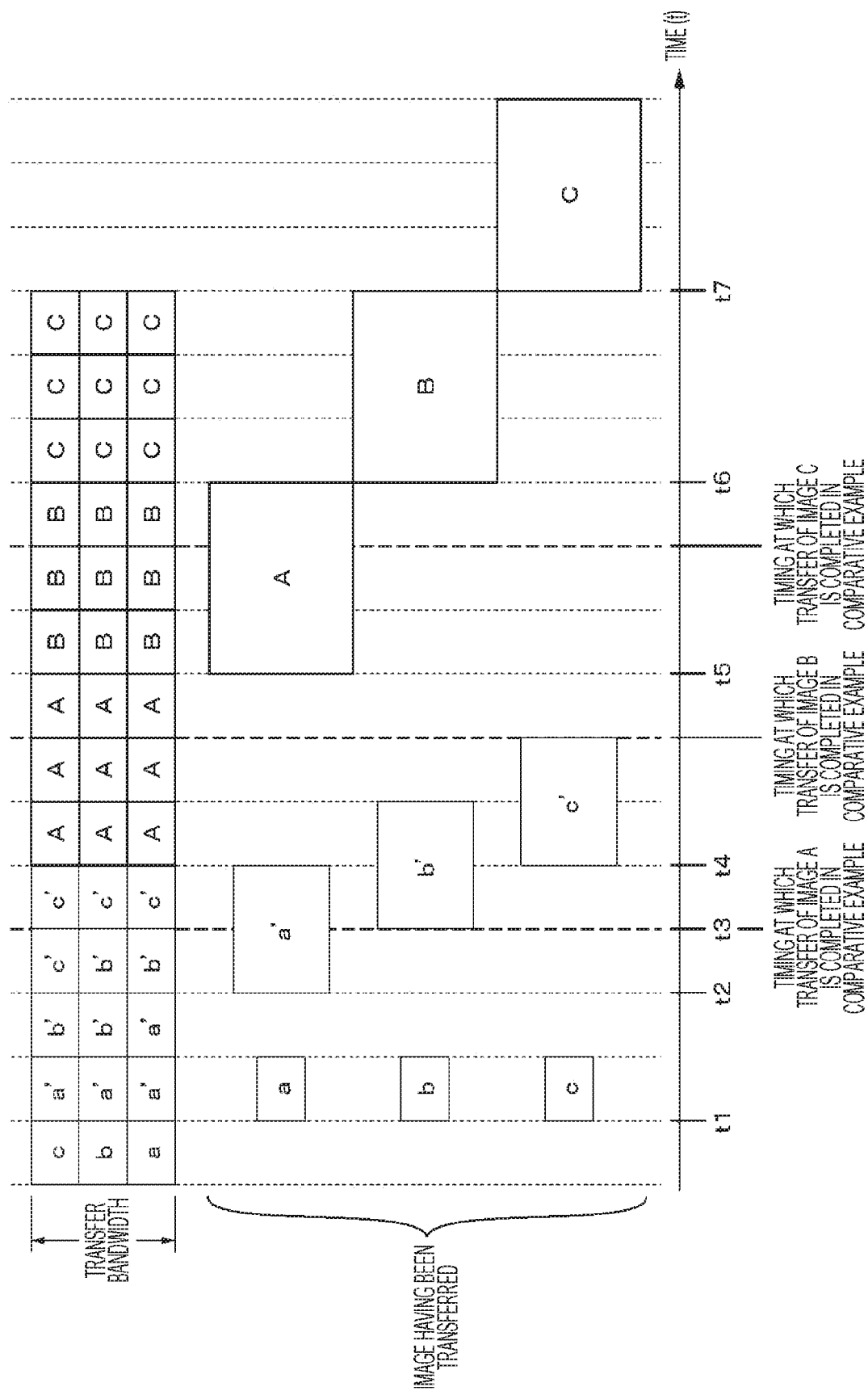
FIG. 4 is a diagram illustrating a first aspect of a transfer process of the present technology.

In FIG. 4, the time axis advances from left to right, the upper part illustrates the image transfer bandwidth of image data between the imaging device 100 and the terminal device 200, and the lower part illustrates image data that has been transmitted and become available in the terminal device 200. Images are captured in the order of the image A, the image B, and the image C, and are transferred in accordance with the capturing order in principle.

When image capturing is performed to obtain the original image A, the original image B, and the original image C, and a medium image and a small image are created for each image, first, transfer of the small image a, the small image b, and the small image c from the imaging device 100 to the terminal device 200 starts simultaneously. Then, at time t1, the transfer is completed and the small image a, the small image b, and the small image c become available in the terminal device 200.

Following the transfer of the small image a, the small image b, and the small image c, the transfer of the medium image a', the medium image b', and the medium image c' is started. Since the transfer bandwidth of the network between the imaging device 100 and the terminal device 200 does not allow simultaneous transmission of a plurality of medium images, the medium image a', the medium image b', and the medium image c' are transferred in this order.

Then, at time t2, the transfer of the medium image a' is completed and the medium image a' becomes available in the terminal device 200. Furthermore, at time t3, the transfer of the medium image b' is completed and the medium image b' becomes available in the terminal device 200. Moreover, at time t4, the transfer of the medium image c' is completed and the medium image c' becomes available in the terminal device 200.

After the transfer of the medium image c', the transfer of the original image A, the original image B, and the original image C is started. Since the transfer bandwidth of the network between the imaging device 100 and the terminal device 200 does not allow simultaneous transmission of a plurality of original images, the original image A, the original image B, and the original image C are transferred in this order.

Then, at time t5, the transfer of the original image A is completed and the original image A becomes available in the terminal device 200. Furthermore, at time t6, the transfer of the original image B is completed and the original image B becomes available in the terminal device 200. Moreover, at time t7, the transfer of the original image C is completed and the original image C becomes available in the terminal device 200.

Here, compared with the conventional technology as the comparative example illustrated in FIG. 3, all of the medium image a', the medium image b', and the medium image c' in the first aspect are transferred to the terminal device 200 and becomes available earlier than the original image A, the original image B, and the original image C.

Therefore, for a purpose of use in which a small image cannot be used because the quality is not sufficient, but a high-quality image having a data size as large as the original image is not necessary, a medium image may be used so that an image is available in the terminal device 200 earlier than the conventional technology.

Furthermore, since the original image is also transferred to the terminal device 200 after the transfer of the medium image is completed, it is possible to select use of the original image. This configuration provides wide range of selection of images, thereby improving convenience for users.

Note that the transfer bandwidth of the network between the imaging device 100 and the terminal device 200 illustrated in FIG. 4 is set for convenience of description only. Thus, in a case where the transfer bandwidth is sufficiently large, for example, the small image a, the small image b, the small image c, and the medium image c' may be transferred simultaneously.

[1-4-2. Second Aspect of Transfer]

Next, a second aspect of transfer will be described with reference to FIG. 5. Note that, the definitions of image A, image B, image C, medium image, and small image are similar to those in the first aspect. Furthermore, images are captured in the order of an image A, an image B, and an image C, and are transferred in accordance with the capturing order in principle. Furthermore, it is assumed that the network between the imaging device 100 and the terminal device 200 has a transfer bandwidth, which is always constant and which allows simultaneous transmission of a small image a, a small image b, and a small image c.

In the second aspect, in a case where meta information is added to an original image, a medium image corresponding to the original image to which the meta information is added is preferentially transferred. This is because an image to which meta information is added is considered to be an image that a user wants to use in the terminal device 200 sooner, or an image that is likely to be used by a user sooner.

As the meta information, any information, such as face detection information obtained by a known face detection technology, subject detection information obtained by known subject detection information, pupil detection information obtained by a known pupil detection technology, color detection information obtained by known color detection information, focus information indicating whether or not the image is in focus, or tag information added by a user to identify the image as an image to be preferentially transferred may be used as long as the information relates to the image.

Figure 5:
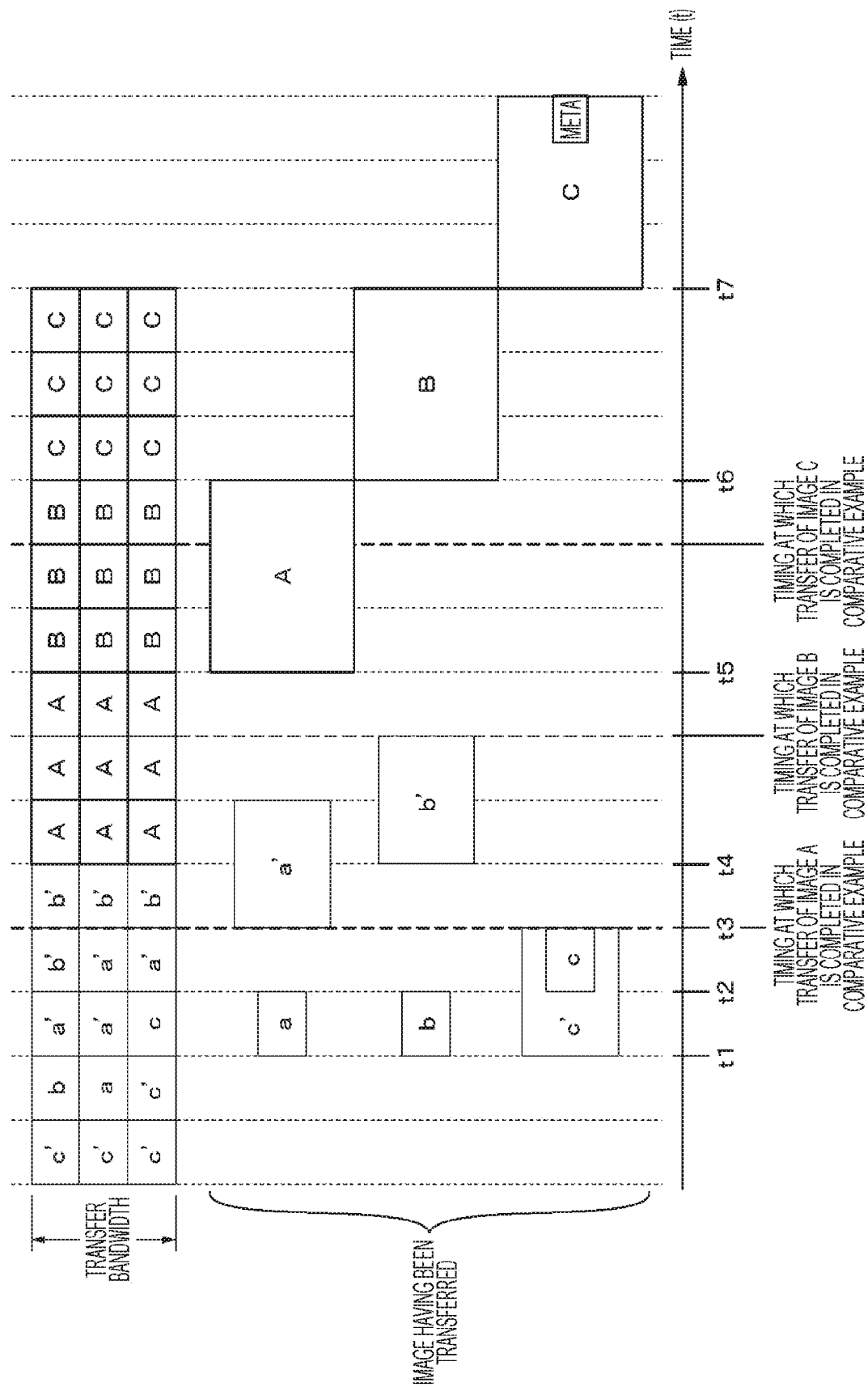
FIG. 5 is a diagram illustrating a second aspect of the transfer process of the present technology.

In FIG. 5, it is assumed that meta information is added to the original image C. Note that, in order to perform this transfer process, it is necessary for the user to set in advance that an image to which specific meta information is added is transferred preferentially over other images.

In a case where meta information is added to the image C, first, transfer of a medium image c' is started. Since the transfer bandwidth of the network between the imaging device 100 and the terminal device 200 does not allow simultaneous transmission of a medium image and a small image, following the transfer of the medium image c', transfer of the small image a, the small image b, and the small image c is started. Since meta information is not added to the image A and the image B, small images, medium images, and original images of the image A and the image B are transferred in this order similarly to the first aspect.

Then, at time t1, the transfer of the medium image c', the small image a, and the small image b is completed and the images become available in the terminal device 200. Furthermore, at time t2, the transfer of the small image c is completed and the small image c is available in the terminal device 200.

After the transfer of the small image a, the small image b, and the small image c, transfer of a medium image a' and a medium image b' is started. Since the transfer bandwidth of the network between the imaging device 100 and the terminal device 200 does not allow simultaneous transmission of a plurality of original images, the medium image a' and the medium image b' are transferred in this order.

Then, at time t3, the transfer of the medium image a' is completed and the medium image a' becomes available in the terminal device 200. Furthermore, at time t4, the transfer of the medium image b' is completed and the medium image b' becomes available in the terminal device 200.

Subsequently, the original image A, the original image B, and the original image C are sequentially transferred, and at time t5, the transfer of the original image A is completed, at time t6, the transfer of the original image B is completed, at time t7, the transfer of the original image C is completed, and the images become available in the terminal device 200.

According to the second aspect, for an image to which meta information is added, a medium image thereof is transferred to the terminal device 200 preferentially over other images. Thus, the medium image becomes available in the terminal device 200 earlier than other images.

For example, in a case where face detection information is used as meta information, a user can preferentially transfer an image with a face in it from images captured by the imaging device 100 to the terminal device 200 and upload it to an SNS. This also enables efficient upload of only images obtained by taking a so-called selfies to an SNS, which has been performed by many people in recent years.

Furthermore, in a case where focus information is used as meta information, it is possible to transfer in-focus images preferentially from a large number of images captured by the imaging device 100 to the terminal device 200. This eliminates the need for a user to check to distinct images depending on whether or not they are in focus or out of focus to perform the transfer process, thus improving the efficiency of image capturing and work using the images after the image capturing.

Furthermore, in a case where images are continually captured and images obtained by image capturing are transferred to the terminal device 200 any time in the background, a user may add tag information to an image that the user wants to transfer preferentially to get the image with the tag information added transferred preferentially over other images being transferred or waiting to be transferred. For example, the imaging device 100 may be configured such that when input is performed on a button or the like included in the input unit 109 of the imaging device 100 within a certain period after an image is captured, tag information is added to the image.

[1-4-3. Third Aspect of Transfer]

Figure 6:
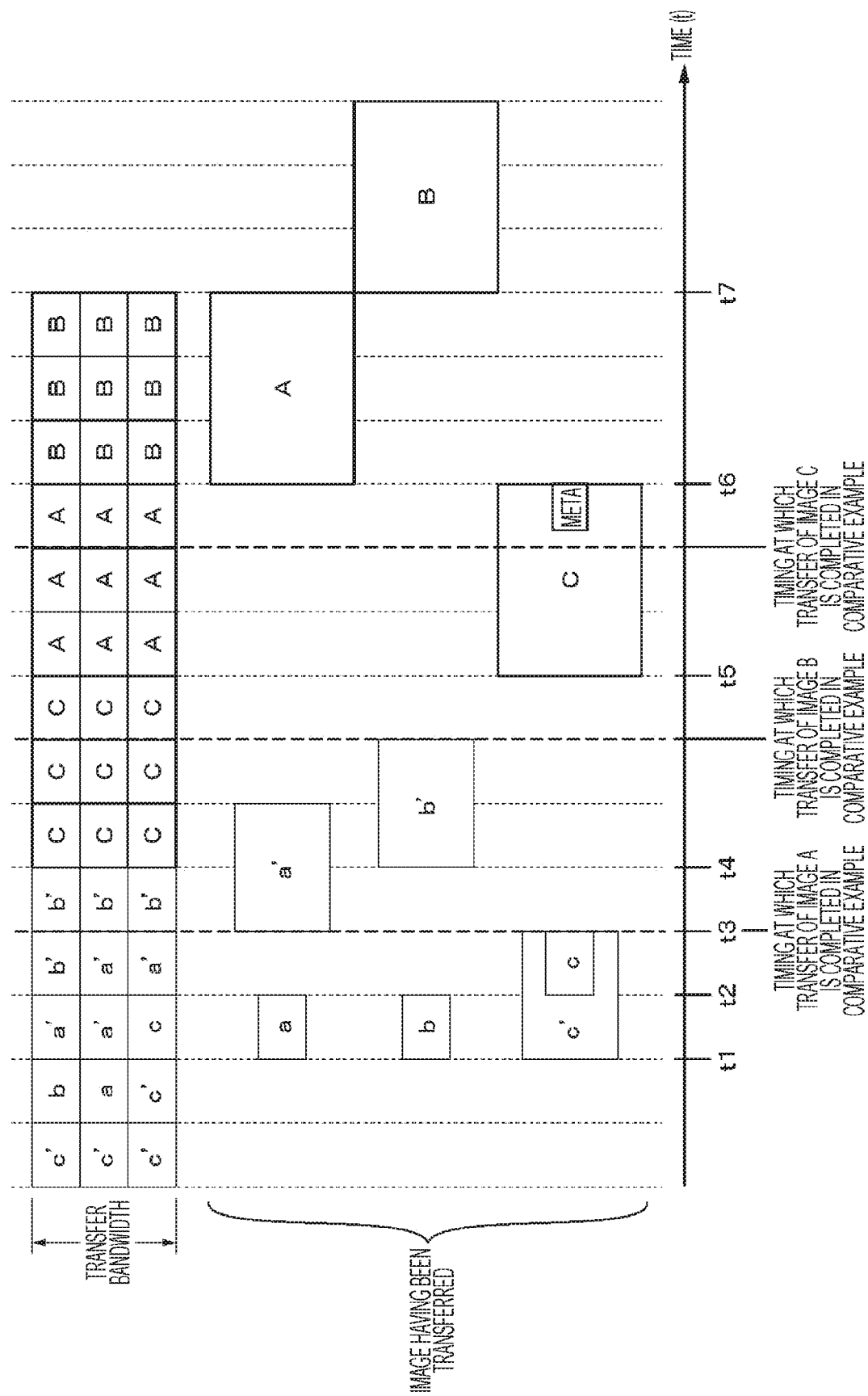
FIG. 6 is a diagram illustrating a third aspect of the transfer process of the present technology.

Next, a third aspect of transfer will be described with reference to FIG. 6. In the third aspect, in a case where meta information is added to an original image, the original image to which the meta information is added and a medium image corresponding to the original image are preferentially transferred. In FIG. 6, it is assumed that meta information is added to the original image C. Note that, in order to perform this transfer process, it is necessary for the user to set in advance that an image to which specific tag information is added is transferred preferentially over other images. Note that, it is assumed that the network between the imaging device 100 and the terminal device 200 has a transfer bandwidth, which is always constant and which allows simultaneous transmission of a small image a, a small image b, and a small image c.

In a case where meta information is added to the image C, first, transfer of a medium image c' is preferentially started. Since the transfer bandwidth of the network between the imaging device 100 and the terminal device 200 does not allow simultaneous transmission of a medium image and a small image, following the transfer of the medium image c', transfer of the small image a, the small image b, and the small image c is started. Since meta information is not added to the image A and the image B, small images, medium images, and original images of the image A and the image B are transferred in this order similarly to the first aspect.

Then, at time t1, the transfer of the medium image c', the small image a, and the small image b is completed and the images become available in the terminal device 200. Furthermore, at time t2, the transfer of the small image c is completed and the small image c is available in the terminal device 200.

After the transfer of the small image a, the small image b, and the small image c, transfer of a medium image a' and a medium image b' is started. Since the transfer bandwidth of the network between the imaging device 100 and the terminal device 200 does not allow simultaneous transmission of a plurality of original images, the medium image a' and the medium image b' are transferred in this order.

Then, at time t3, the transfer of the medium image a' is completed and the medium image a' becomes available in the terminal device 200. Furthermore, at time t4, the transfer of the medium image b' is completed and the medium image b' becomes available in the terminal device 200.

When the transfer of all medium images is completed, transfer of the original image C to which the meta information is added is started preferentially over other original images. Thus, the original image C, the original image A, and the original image B are sequentially transferred, and at time t5, the transfer of the original image C is completed, at time t6, the transfer of the original image A is completed, at time t7, the transfer of the original image B is completed, and the images become available in the terminal device 200.

According to the third aspect, for an image to which meta information is added, a medium image thereof and the original image are transferred to the terminal device 200 preferentially over other images. Thus, the medium image and the original image become available in the terminal device 200 earlier than other images. This aspect is useful in a case, for example, where a user wants to preferentially upload an original image or a medium image of an image with his/her face in it to SNS, send it to a friend, or use it for image processing.

[1-4-4. Fourth Aspect of Transfer]

Next, a fourth aspect of transfer will be described with reference to FIGS. 7-11. The fourth aspect is an aspect of a case in which the transfer bandwidth of the network between the imaging device 100 and the terminal device 200 changes during an image transfer process.

A flow of a process in the fourth aspect will be described with reference to the flowchart of FIG. 7. First, in step S11, the transfer processing unit 121 obtains transfer bandwidth information of the network between the imaging device 100 and the terminal device 200 from the communication control unit 111. The transfer bandwidth information may be field strength (Received Signal Strength Indication: RSSI), transfer mode (802.11b/g/n/ac, etc.), combined information of field strength and transfer mode, and the like. The transfer bandwidth information is supplied to the image creation unit 122.

Next, in step S12, the image creation unit 122 determines the transfer file number on the basis of the transfer bandwidth information. The transfer file number is the number of pieces of image data that are created by the image creation unit 122 and that have data sizes smaller than that of the original image, and corresponds to the number of stages in which an image is transferred. For example, in a case where the transfer file number is 3, the image is transferred in three stages: an original image, a medium image having a data size smaller than that of the original image, and a small image having a data size smaller than that of the medium image. In a case where the transfer file number is 2, the image is transferred in two stages: an original image and an image having a data size smaller than that of the original image. In a case where the transfer file number is 1, only the original image or only an image having a data size smaller than that of the original image is transferred. In this case, it is preferable that setting regarding which of the original image and the image having a smaller data size is to be transferred be made in advance.

Figure 8:
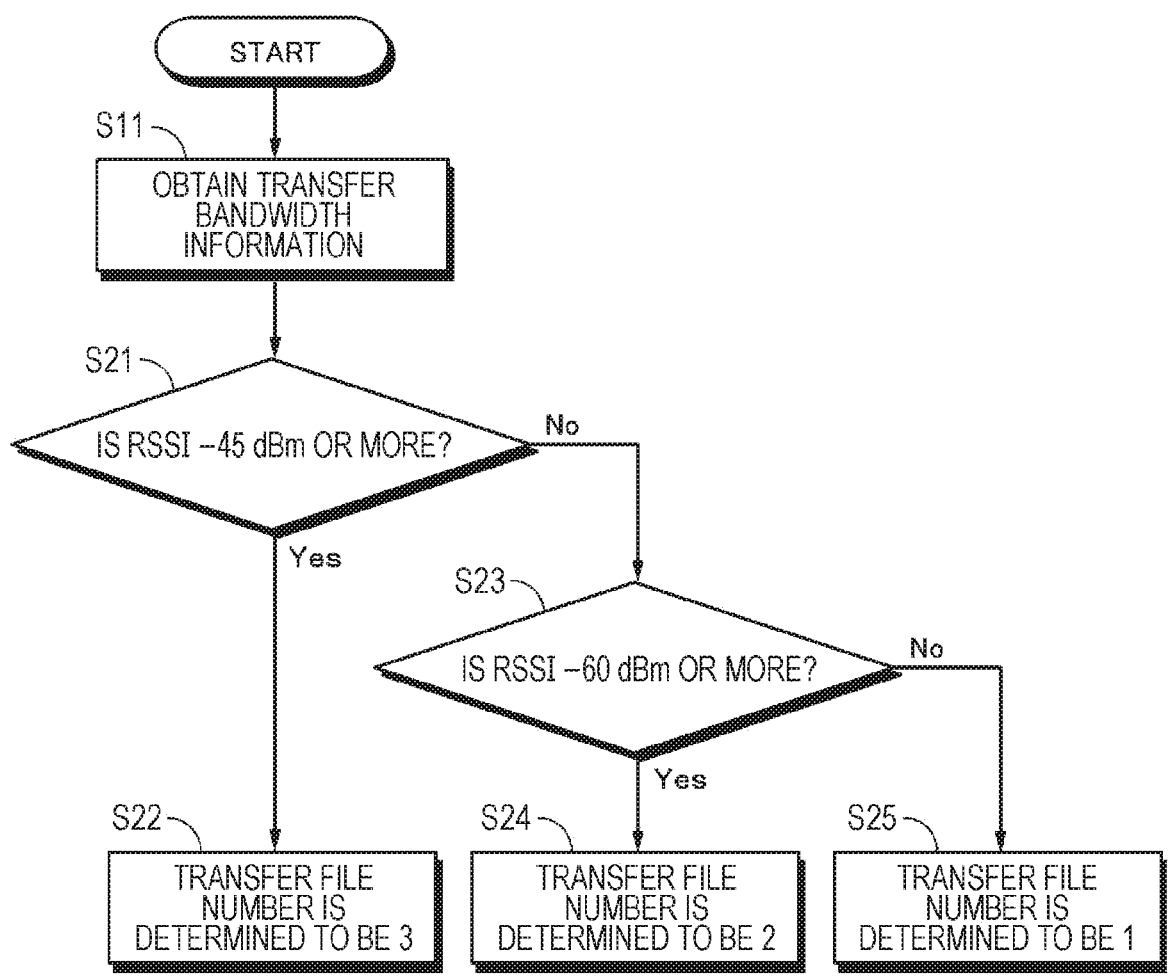
FIG. 8 is a flowchart illustrating a process flow of a fourth aspect of the transfer process of the present technology.

The determination of the transfer file number in step S12 is performed by a process illustrated in FIG. 8, for example. In a case where the RSSI is −45 dBm or more in step S21, the transfer file number is determined to be 3 (step S22). In the case where the transfer file number is 3, a medium image having a data size smaller than that of the original image and a small image having a data size smaller than that of the medium image are created.

Furthermore, in a case where the RSSI is not −45 dBm or more in step S21, and the RSSI is −60 dBm or more in step S23, the transfer file number is determined to be 2 (step S24). In the case where the transfer file number is 2, an image having a data size smaller than that of the original image is created.

In a case where the RSSI is not −60 dBm or more in step S23, the transfer file number is determined to be 1 (step S25). In a case where the transfer file number is 1 and only the original image is transferred from the imaging device 100 to the terminal device 200, an image having a smaller data size is not created. In a case where the transfer file number is 1 and only an image having a data size smaller than the original image is transferred, one image having a data size smaller than that of the original image is created. Note that the values of −60 dBm and −45 dBm, and the transfer file numbers corresponding thereto are merely examples, and the present technology is not limited to these values.

Figure 7:
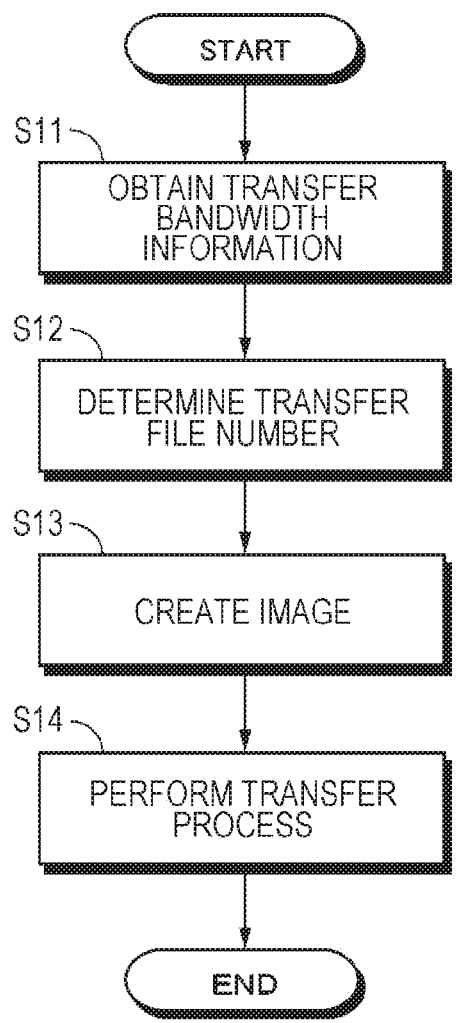
FIG. 7 is a flowchart illustrating a process flow of a fourth aspect of the transfer process of the present technology.

The description returns to the flowchart in FIG. 7. After the transfer file number is determined in step S12, the transfer file number information is supplied to the image creation unit 122, and an image having a data size smaller than that of the original image is created by the image creation unit 122 in step S13. Then, a transfer process is performed in step S14. This transfer process is the above-described first aspect, second aspect, or third aspect of transfer.

Figure 9:
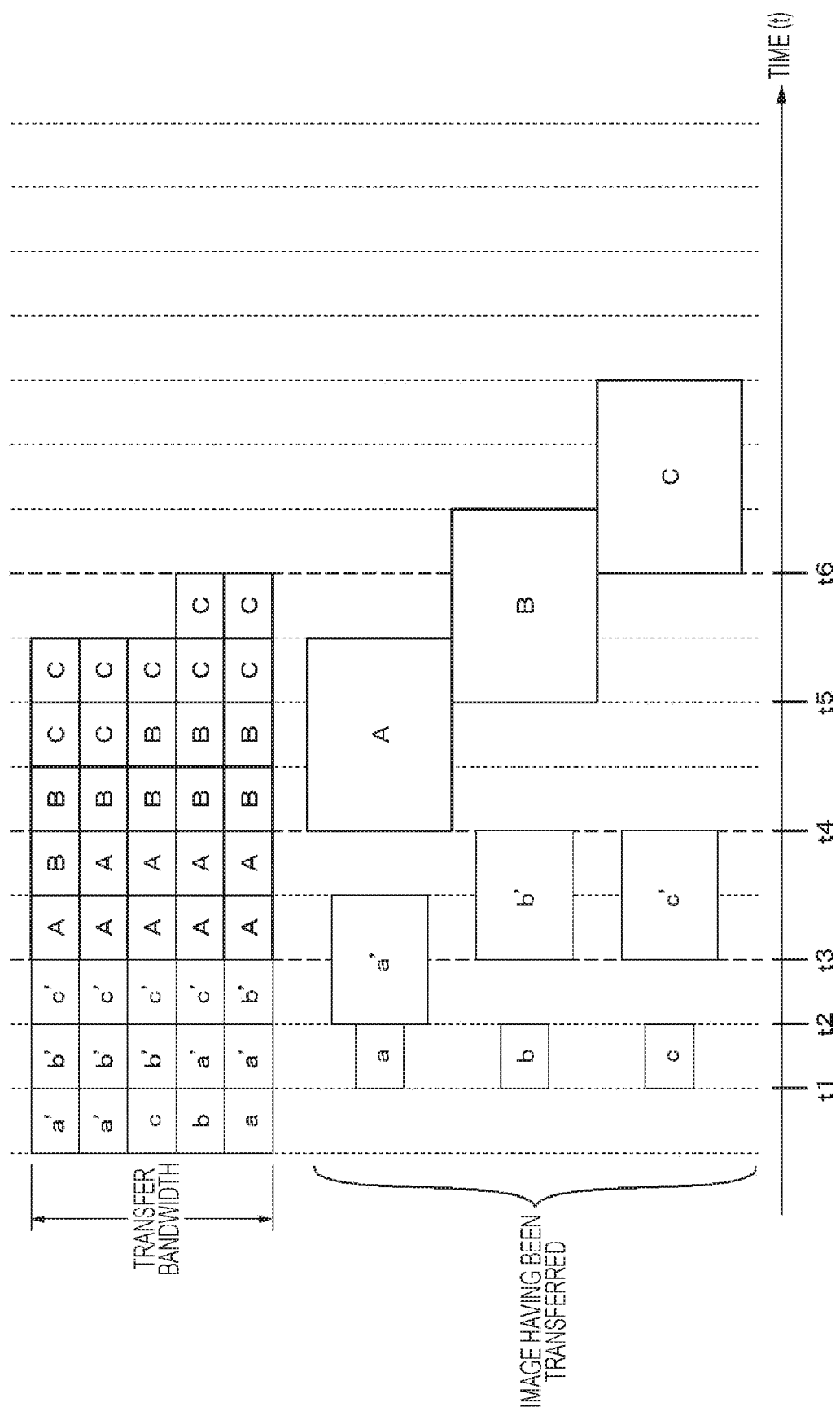
FIG. 9 is a diagram illustrating a fourth aspect of the transfer process of the present technology.

FIG. 9 is a diagram illustrating a transfer process in a case where the transfer bandwidth is increased from the state illustrated in the first aspect. The example of FIG. 9 is a case where the transfer file number is determined to be 3 by the process described with reference to FIGS. 7 and 8.

Since the transfer bandwidth has increased, when image transfer is started, the transfer of the medium image a' is started in addition to transfer of the small image a, the small image b, and the small image c. Then, at time t1, the transfer of the small images is completed and the small image a, the small image b, and the small image c become available in the terminal device 200.

Following the transfer of the medium image a', which is started at the same time as start of the transfer of the small image a, the small image b, and the small image c, transfer of the medium image b' and the medium image c' is started. Then, at time t2, the transfer of the medium images is completed and the medium images become available in the terminal device 200. Furthermore, at time t3, the transfer of the medium image b' and the medium image c' is completed and the medium image b' and the medium image c' become available in the terminal device 200.

After the transfer of the medium image c', the transfer of the original image A, the original image B, and the original image C is started. Since the transfer bandwidth of the network between the imaging device 100 and the terminal device 200 does not allow simultaneous transmission of a plurality of original images, the original image A, the original image B, and the original image C are transferred in this order.

Then, at time t4, the transfer of the original image A is completed and the original image A becomes available in the terminal device 200. Furthermore, at time t5, the transfer of the original image B is completed and the original image B becomes available in the terminal device 200. Moreover, at time t6, the transfer of the original image C is completed and the original image C becomes available in the terminal device 200.

According to the fourth aspect, in a case where the transfer bandwidth changes, the transfer file number is set according to the change, whereby the time required for transferring files can be shortened and images can be transferred efficiently.

Figure 10:
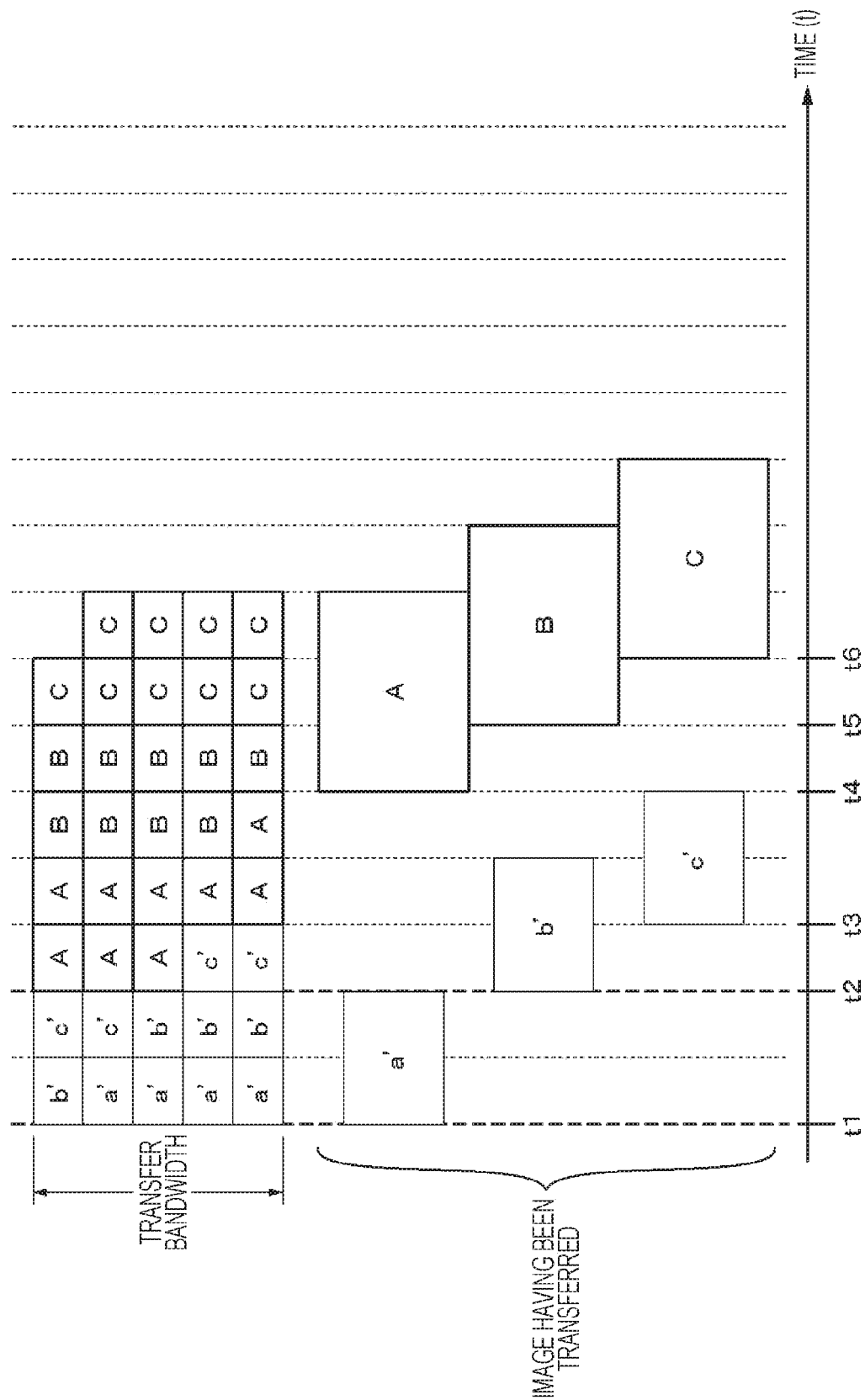
FIG. 10 is a diagram illustrating a fourth aspect of the transfer process of the present technology.

FIG. 10 illustrates a case where the transfer file number is determined on the basis of the transfer bandwidth information, and the transfer file number is determined to be 2. In a case where the transfer file number is determined to be 2, and in a case where the transfer bandwidth is large and is a transfer bandwidth sufficient to transfer the medium image, only medium images and original images may be transferred as illustrated in FIG. 10. In this case, small images are not transferred so that medium images can be transferred preferentially.

Figure 11:
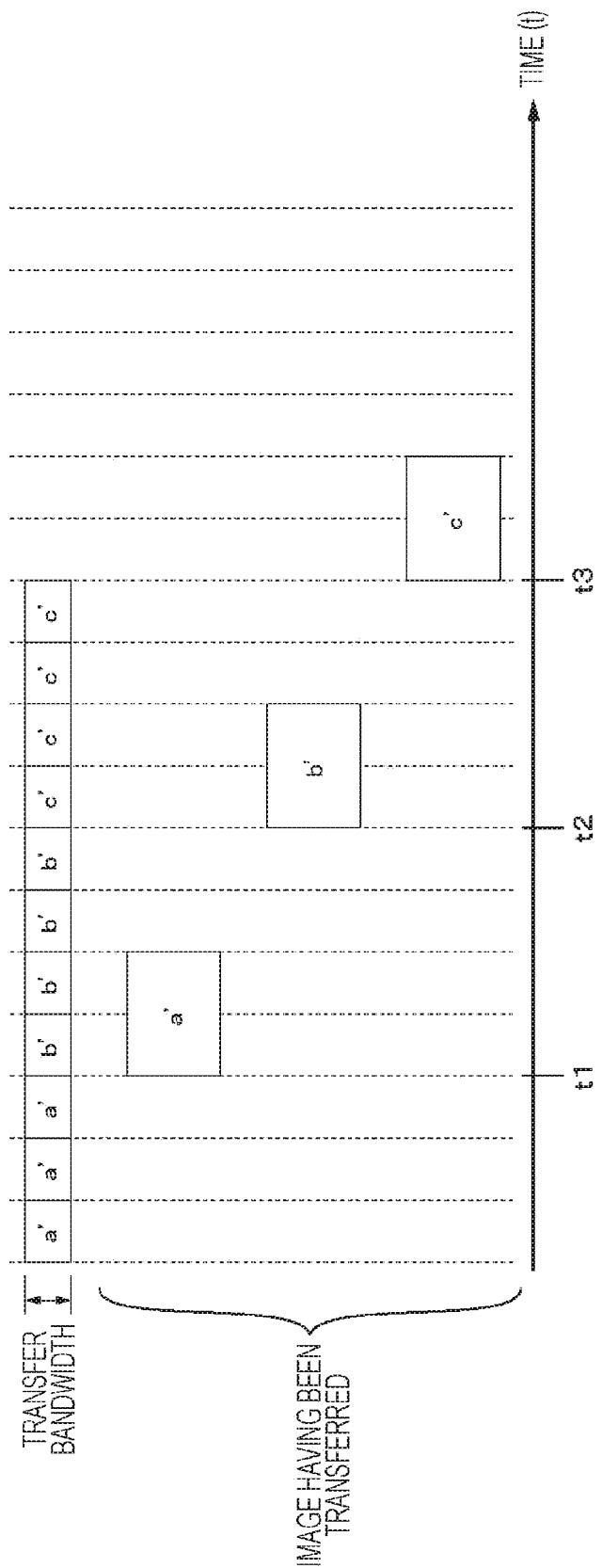
FIG. 11 is a diagram illustrating a fourth aspect of the transfer process of the present technology.

FIG. 11 illustrates a case where the transfer file number is determined on the basis of the transfer bandwidth information, and the transfer file number is determined to be 1. In a case where the transfer bandwidth is small and the transfer file number is determined to be 1, only medium images may be transferred for all images as illustrated in FIG. 11. In this case, small images are not transferred so that medium images can be transferred preferentially. Note that, in a case where the transfer file number is determined to be 1, only original images may be transferred for all images.

Note that, the transfer file number is not limited to 1 to 3, and may be more. For example, in a case where the transfer file number is 4, an image is transferred in four stages: an original image; a medium image having a data size smaller than that of the original image; a small image having a data size smaller than that of the medium image; and a second medium image having a data size equal to or larger than that of the medium image and equal to or smaller than that of the original image, or a data size equal to or larger than that of the small image and equal to or smaller than that of the medium image.

Transfer bandwidth changes depending on various external factors, such as the distance between the imaging device 100 and the terminal device 200, the influence of other devices using the same communication band, the number of other devices accessing the network used to connect the imaging device 100 and the terminal device 200, and a user touching the communication antenna.

As described above, first to fourth transfer processes according to the present technology is performed. In any of the first to fourth transfer aspects, when the transfer of an original image to the terminal device 200 is finally completed, a small image and a medium image that have been transferred to the terminal device 200 may be kept in the terminal device 200 or may be deleted automatically. In a case where a small image and a medium image are kept in the terminal device 200, the small image, the medium image, and the original image may be grouped, the small image may be used for display in a list with other images, and the medium image or the original image may be used for uploading to an SNS, etc. Furthermore, after the transfer to the terminal device 200 is completed, all images may be uploaded from the terminal device 200 to the cloud through the Internet. The cloud refers to one aspect of utilization of a computer, and is constructed on a server of the cloud service provider company. Required processes are basically all performed on the server side. The user saves data on the server over the Internet rather than on one's own personal computer, smartphone, mobile phone, or the like. Therefore, the user can use the service and view, edit, or upload data and the like also in a variety of environments, such as at home, at a company, in an Internet café, at school, or a place where one has gone.

2. Application Examples

The technology according to the present disclosure can be applied to various products. For example, the technology according to the present disclosure may be applied to an operation room system.

Figure 12:
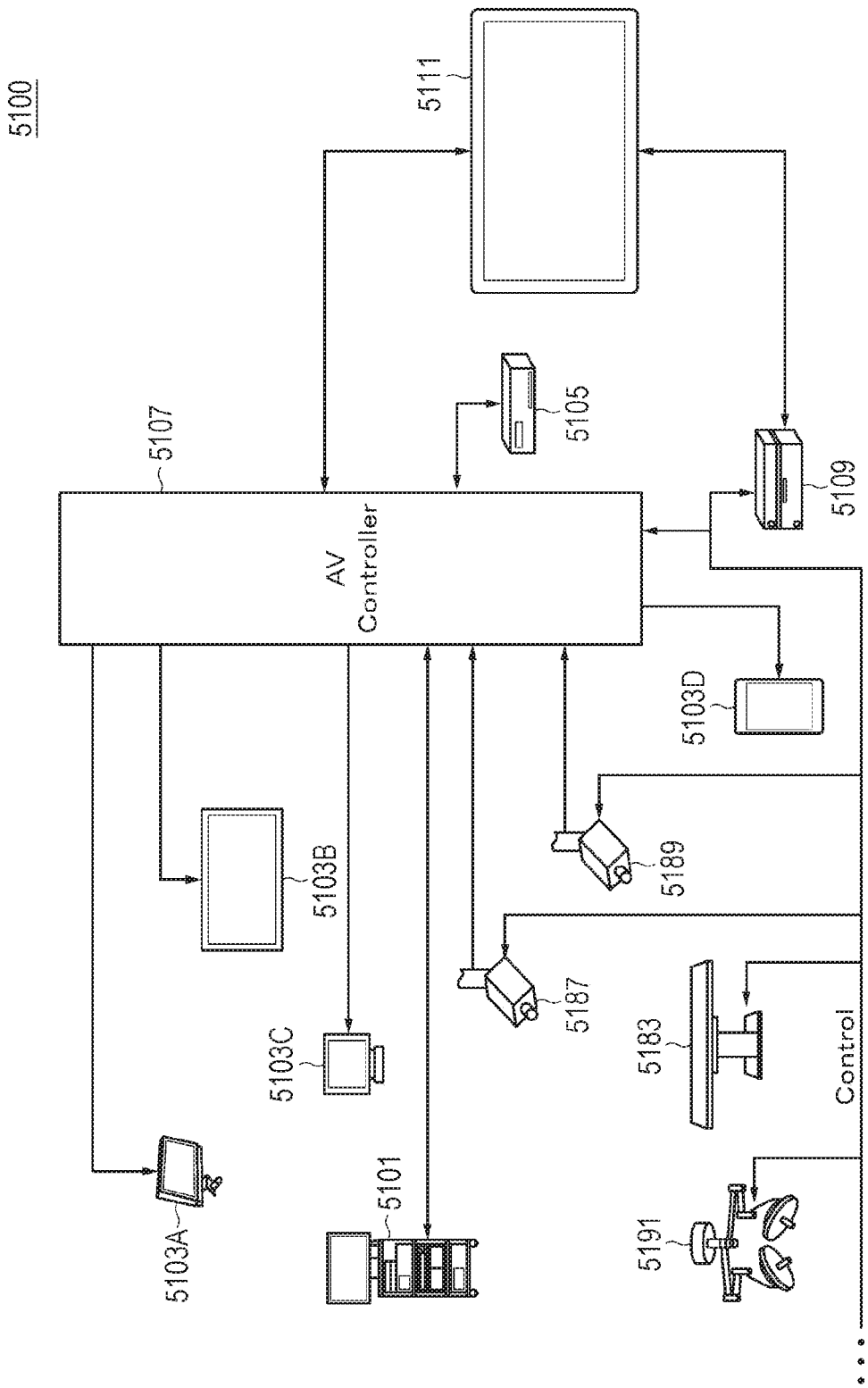
FIG. 12 is a diagram schematically illustrating an overall configuration of an operation room system.

FIG. 12 is a diagram schematically illustrating an overall configuration of an operation room system 5100 to which the technology according to the present disclosure can be applied. Referring to FIG. 12, the operation room system 5100 is configured by connecting a device group installed in the operation room to be able to cooperate with each other through an audiovisual controller (AV controller) 5107 and an operation room control device 5109.

In the operation room, various devices may be installed. FIG. 12 illustrates, as an example, a device group 5101 including various devices for endoscopic operation, a ceiling camera 5187 provided on a ceiling of the operation room to capture images of an operator's hand, an operation field camera 5189 provided on the ceiling of the operation room to capture images of a state of the entire operation room, a plurality of display devices 5103A to 5103D, a recorder 5105, a patient bed 5183, and an illumination lamp 5191.

Here, among these devices, the device group 5101 belongs to an endoscopic operation system 5113 to be described below, and includes an endoscope, a display device that displays images captured by the endoscope, and the like. Each device included in the endoscopic operation system 5113 may also be referred to as medical equipment. Meanwhile, the display devices 5103A to 5103D, the recorder 5105, the patient bed 5183, and the illumination lamp 5191 are devices that are installed, for example, in the operation room separately from the endoscopic operation system 5113. Each device that is not included in the endoscopic operation system 5113 may also be referred to as non-medical equipment. The AV controller 5107 and/or the operation room control device 5109 cooperatively control operations of the medical equipment and the non-medical equipment.

The AV controller 5107 comprehensively controls processes related to image display on the medical equipment and the non-medical equipment. Specifically, each of the device group 5101, the ceiling camera 5187 and the operation field camera 5189 from among the devices included in the operation room system 5100 may be a device having a function of transmitting information to be displayed during operation (such information is hereinafter referred to also as display information, and such device having a transmission function is hereinafter referred to also as a transmission source device). Meanwhile, each of the display devices 5103A to 5103D may be a device to which display information is output (the device is hereinafter referred to also as an output destination device). Furthermore, the recorder 5105 may be a device that serves as both of a transmission source device and an output destination device. The AV controller 5107 has a function of controlling operations of a transmission source device and an output destination device to obtain display information from the transmission source device, and to transmit the display information to the output destination device to get the display information displayed or recorded. Note that the display information is various images captured during the operation, various types of information regarding the operation (for example, physical information regarding the patient, past examination results, information regarding the operation method, and the like), and the like.

Specifically, to the AV controller 5107, information regarding an image of an operation site in a body cavity of the patient captured by the endoscope is transmitted as the display information from the device group 5101. Furthermore, from the ceiling camera 5187, information regarding an image of a hand of the operator captured by the ceiling camera 5187 may be transmitted as the display information. Furthermore, from the operation field camera 5189, information regarding an image of a state of the entire operation room captured by the operation field camera 5189 may be transmitted as display information. Note that, in a case where another device having an imaging-capturing function exists in the operation room system 5100, the AV controller 5107 may obtain information regarding an image captured by the other device as the display information from the other device.

Alternatively, for example, in the recorder 5105, information regarding these images captured in the past is recorded by the AV controller 5107. The AV controller 5107 can obtain, as display information, information regarding the images captured in the past from the recorder 5105. Note that various types of information regarding the operation may be recorded in the recorder 5105 in advance.

The AV controller 5107 controls at least one of the display devices 5103A to 5103D, which are output destination devices, such that obtained display information (that is, images captured during operation or various types of information regarding the operation) is displayed on the display device. In the illustrated example, the display device 5103A is a display device installed on and suspended from the ceiling of the operation room, the display device 5103B is a display device installed on a wall surface of the operation room, the display device 5103C is a display device placed on a desk in the operation room, and the display device 5103D is a mobile device (for example, a tablet personal computer (PC)) having a display function.

Furthermore, the operation room system 5100 may include a device external to the operation room although such device is not illustrated in FIG. 12. The device external to the operation room may be, for example, a server connected to a network constructed inside or outside a hospital, a PC used by a medical staff, a projector installed in a conference room of the hospital, or the like. In a case where such an external device is provided outside the hospital, the AV controller 5107 can make a display device in other hospital display the display information through a television conference system and the like for remote medical treatment.

The operation room control device 5109 comprehensively controls processes other than the process related to the image display on the non-medical equipment. For example, the operation room control device 5109 controls driving of the patient bed 5183, the ceiling camera 5187, the operation field camera 5189, and the illumination lamp 5191.

A centralized operation panel 5111 is provided in the operation room system 5100, and a user can issue an instruction regarding image display to the AV controller 5107 through the centralized operation panel 5111 and issue an instruction regarding the operation of the non-medical equipment to the operation room control device 5109. The centralized operation panel 5111 is configured by providing a touch panel on a display surface of the display device.

Figure 13:
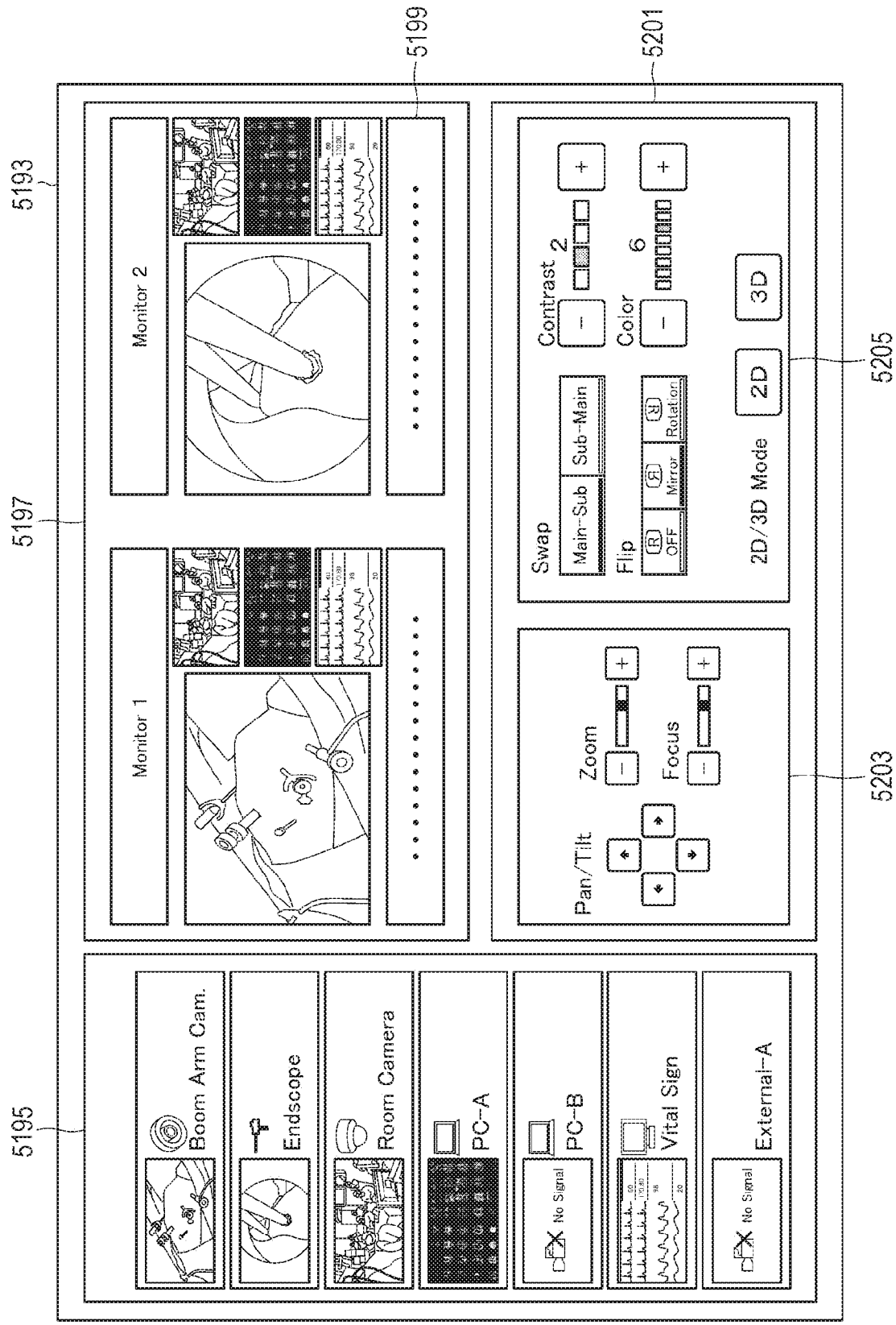
FIG. 13 is a view illustrating a display example of an operation screen on a centralized operation panel.

FIG. 13 is a view illustrating a display example of an operation screen on the centralized operation panel 5111. FIG. 13 illustrates, as an example, an operation screen corresponding to a case where two display devices are provided as output destination devices in the operation room system 5100. Referring to FIG. 13, an operation screen 5193 is provided with a transmission source selection area 5195, a preview area 5197, and a control area 5201.

In the transmission source selection area 5195, transmission source devices included in the operation room system 5100 and thumbnail screens indicating pieces of display information of the respective transmission source devices are displayed in association with each other. A user can select display information that the user wants the display device to display from among the transmission source devices displayed in the transmission source selection area 5195.

In the preview area 5197, previews of screens of the two display devices (Monitor 1 and Monitor 2), which are output destination devices, are displayed. In the illustrated example, four images are displayed by picture in picture (PinP) display on one display device. The four images correspond to display information transmitted from the transmission device selected in the transmission source selection area 5195. One of the four images is displayed in a comparatively large size as a main image while the remaining three images are displayed in a comparatively small size as sub images. The user can switch the main image to one of the sub images by appropriately selecting one of the areas displaying four images. Furthermore, a status display area 5199 is provided in a portion below the areas in which the four images are displayed, and a status regarding an operation (for example, elapsed time of operation, physical information of patient, and the like) may be appropriately displayed in the area.

In the control area 5201, a transmission source operation area 5203 where Graphical User Interface (GUI) components used to perform operations on the transmission source device are displayed and an output destination operation area 5205 where GUI components used to perform operations on the output destination device are displayed are provided. In the illustrated example, GUI components used to perform various operations on a camera (panning, tilting and zooming) in a transmission source device having an image-capturing function are provided in the transmission source operation area 5203. The user can control operation of the camera of a transmission source device by appropriately selecting any of the GUI components. Note that, although not illustrated, in a case where the transmission source device selected in the transmission source selection area 5195 is a recorder (in other words, an image recorded in the recorder in the past is displayed in the preview area 5197), GUI components used to perform operations such as reproduction, stop, rewind, fast-forward, and the like of the image may be provided in the transmission source operation area 5203.

Furthermore, in the output destination operation area 5205, GUI components used to perform various operations regarding display on the display device that is the output destination device (swap, flip, color adjustment, contrast adjustment, and switching between 2D display and 3D display) are provided. A user appropriately selects some of these GUI components so as to operate the display on the display device.

Note that the operation screen displayed on the centralized operation panel 5111 is not limited to the illustrated example. A user may be allowed to input an operation to each device, which is included in the operation room system 5100 and may be controlled by the AV controller 5107 and the operation room control device 5109 through the centralized operation panel 5111.

Figure 14:
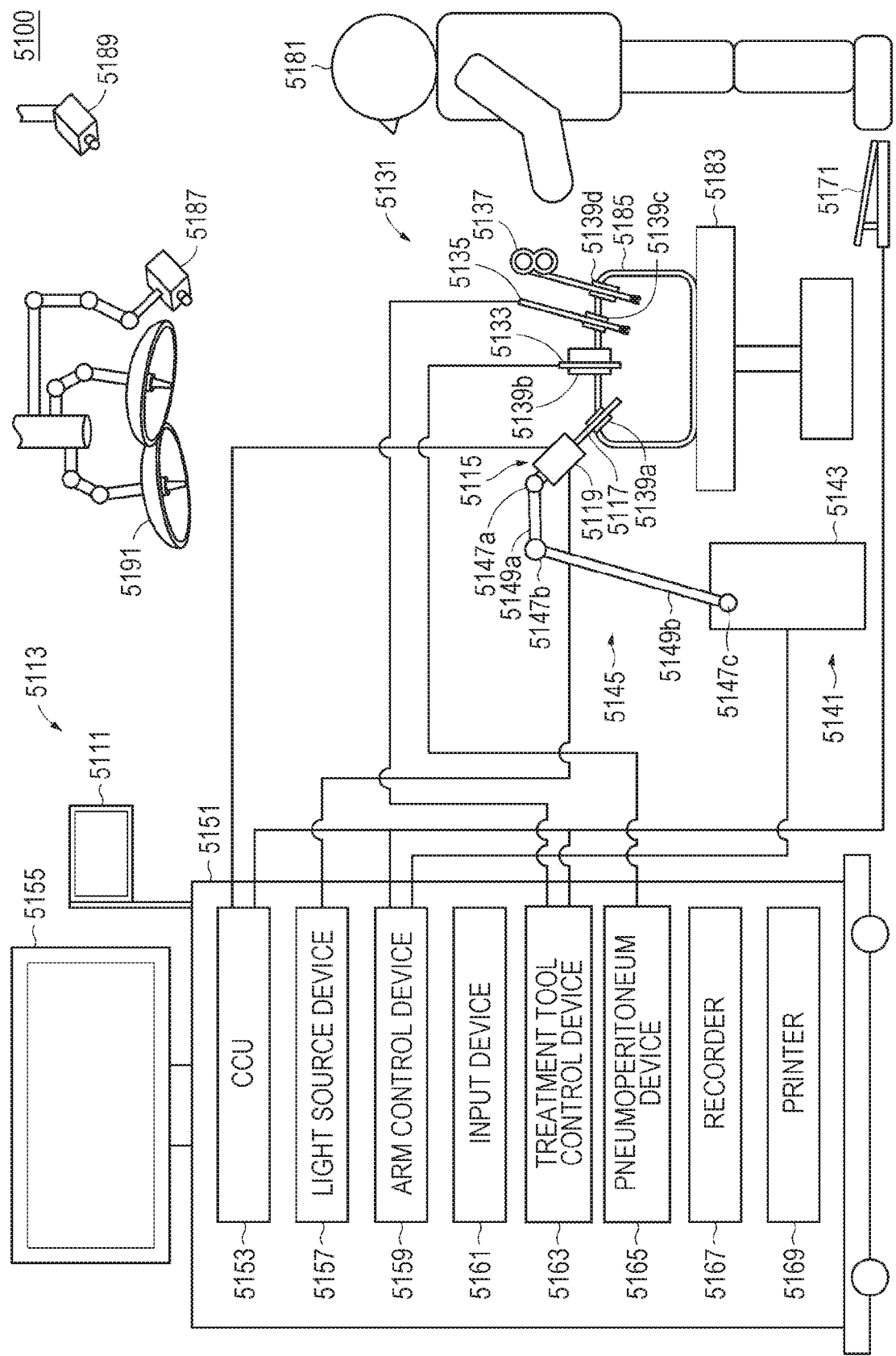
FIG. 14 is a diagram illustrating an example of a state of operation to which the operation room system is applied.

FIG. 14 is a diagram illustrating an example of a state of operation to which the operation room system as described above is applied. The ceiling camera 5187 and the operation field camera 5189 are provided on the ceiling of the operation room such that it can capture an image of the hands of an operator (surgeon) 5181 who performs treatment for an affected part of a patient 5185 on the patient bed 5183 and the entire operation room. The ceiling camera 5187 and the operation field camera 5189 may have a magnification adjustment function, a focal distance adjustment function, an imaging direction adjustment function, and the like. The illumination lamp 5191 is provided on the ceiling of the operation room and illuminates at least the hands of the operator 5181. The illumination lamp 5191 may be configured to allow appropriate adjustment of an irradiation light amount, a wavelength (color) of irradiation light, an irradiation direction of light, and the like.

The endoscopic operation system 5113, the patient bed 5183, the ceiling camera 5187, the operation field camera 5189, and the illumination lamp 5191 are connected through the AV controller 5107 and the operation room control device 5109 as illustrated in FIG. 12 (not illustrated in FIG. 14) so as to be able to cooperate with each other. The centralized operation panel 5111 is provided in the operation room, and a user can appropriately operate the devices existing in the operation room through the centralized operation panel 5111 as described above.

In the description below, a configuration of the endoscopic operation system 5113 will be described in detail. As illustrated, the endoscopic operation system 5113 includes an endoscope 5115, other operation tools 5131, a support arm device 5141 for supporting the endoscope 5115, and a cart 5151 on which various devices for endoscopic operation are mounted.

In endoscopic operation, instead of cutting an abdominal wall to open the abdomen, the abdominal wall is punctured by a plurality of cylindrical puncture devices referred to as trocars 5139*a* to 5139*d*. Then, a lens barrel 5117 of the endoscope 5115 and the other operation tools 5131 are inserted into a body cavity of the patient 5185 through the trocars 5139*a* to 5139*d*. In the illustrated example, as the other operation tools 5131, a pneumoperitoneum tube 5133, an energy treatment tool 5135 and forceps 5137 are inserted into the body cavity of the patient 5185. Furthermore, the energy treatment tool 5135 is a treatment tool for performing incision and peeling of a tissue, sealing of a blood vessel or the like by high frequency current or ultrasonic vibration. However, the illustrated operation tools 5131 are only exemplary, and various operation tools generally used for endoscopic operation, for example, tweezers, a retractor, and the like may be used as the operation tools 5131.

An image of an operation site in the body cavity of the patient 5185 captured by the endoscope 5115 is displayed on a display device 5155. The operator 5181 performs treatment such as removal of an affected part, for example, using the energy treatment tool 5135 and the forceps 5137 while viewing the image of the operation site displayed on the display device 5155 in real time. Note that, although not illustrated, the pneumoperitoneum tube 5133, the energy treatment tool 5135, and the forceps 5137 are supported by the operator 5181, an assistant, or the like during operation.

(Support Arm Device)

The support arm device 5141 includes an arm portion 5145 extending from a base portion 5143. In the illustrated example, the arm portion 5145 includes joint portions 5147*a*, 5147*b*, and 5147*c* and links 5149*a* and 5149*b*, and is driven under the control performed by an arm control device 5159. The endoscope 5115 is supported by the arm portion 5145, and the position and the posture of the endoscope 5115 are controlled. With this configuration, the position of the endoscope 5115 may be stably fixed.

(Endoscope)

The endoscope 5115 includes the lens barrel 5117, which has a region of a certain length from a distal end thereof to be inserted into a body cavity of the patient 5185, and a camera head 5119 connected to a proximal end of the lens barrel 5117. In the illustrated example, the endoscope 5115 formed as a so-called rigid endoscope having the lens barrel 5117 that is rigid is illustrated. However, the endoscope 5115 may be formed as a so-called flexible endoscope having the lens barrel 5117 that is flexible.

At the distal end of the lens barrel 5117, an opening in which an objective lens is fitted is provided. To the endoscope 5115, a light source device 5157 is connected such that light generated by the light source device 5157 is guided to a distal end of the lens barrel 5117 by a light guide extending inside the lens barrel 5117 and is applied toward an observation target in a body cavity of the patient 5185 through the objective lens. Note that the endoscope 5115 may be a forward-viewing endoscope, an oblique-viewing endoscope, or a side-viewing endoscope.

An optical system and an imaging element are provided inside the camera head 5119, and light reflected by the observation target (observation light) is condensed to the imaging element by the optical system. The observation light is photo-electrically converted by the imaging element to generate an electric signal corresponding to the observation light, that is, an image signal corresponding to an observation image. The image signal is transmitted as RAW data to a camera control unit (CCU) 5153. Note that the camera head 5119 has a function of adjusting the magnification and the focal distance by appropriately driving the optical system of the camera head 5119.

Note that, for example, to realize stereoscopic viewing (3D display) or the like, a plurality of imaging elements may be provided in the camera head 5119. In this case, a plurality of relay optical systems is provided inside the lens barrel 5117 so as to guide the observation light to each of the plurality of imaging elements.

(Various Devices Mounted on Cart)

The CCU 5153 includes a central processing unit (CPU), a graphics processing unit (GPU), or the like and comprehensively controls operation of the endoscope 5115 and the display device 5155. Specifically, the CCU 5153 performs, on an image signal received from the camera head 5119, various image processes for displaying an image based on the image signal such as, for example, a development process (demosaic process). The CCU 5153 provides the image signal subjected to the image process to the display device 5155. Furthermore, to the CCU 5153, the AV controller 5107 illustrated in FIG. 12 is connected. The CCU 5153 provides the image signal subjected to the image process also to the AV controller 5107. Furthermore, the CCU 5153 transmits a control signal to the camera head 5119 to control driving of the camera head 5119. The control signal may include information regarding an image capturing condition such as magnification or a focal distance. The information regarding the image capturing condition may be input through an input device 5161 or may be input through the centralized operation panel 5111 described above.

The display device 5155 displays, under the control of the CCU 5153, an image based on an image signal subjected to the image process by the CCU 5153. In a case where the endoscope 5115 is capable of high-resolution image capturing, for example, 4K (horizontal pixel number 3840×vertical pixel number 2160), 8K (horizontal pixel number 7680× vertical pixel number 4320), or the like and/or supports 3D display, then as the display device 5155, a display device capable of high-resolution display and/or a display device capable of 3D display may be used corresponding to the above-described endoscopes respectively. In the case where the endoscope 5115 is capable of high-resolution image capturing, such as 4K, 8K, or the like, more immersive feeling can be obtained by using a display device 5155 having a size equal to or larger than 55 inches. Furthermore, depending on the purpose of use, a plurality of display devices 5155 having various resolutions and/or various sizes may be provided.

The light source device 5157 includes a light source such as, a light emitting diode (LED), or the like and supplies irradiation light for capturing an image of an operation site to the endoscope 5115.

The arm control device 5159 includes, for example, a processor such as a CPU and operates according to a predetermined program so as to control driving of the arm portion 5145 of the support arm device 5141 according to a predetermined control method.

The input device 5161 is an input interface to the endoscopic operation system 5113. A user can input various types of information or instruction to the endoscopic operation system 5113 through the input device 5161. For example, a user inputs various types of information regarding an operation such as physical information of a patient, information regarding an operative method of the operation, and the like through the input device 5161. Furthermore, for example, a user inputs an instruction to drive the arm portion 5145, an instruction to change an image capturing condition (type of irradiation light, magnification, focal distance, and the like) of the endoscope 5115, an instruction to drive the energy treatment tool 5135, and the like through the input device 5161.

The type of the input device 5161 is not limited, and the input device 5161 may be any of various known input devices. As the input device 5161, for example, a mouse, a keyboard, a touch panel, a switch, a foot switch 5171, and/or a lever, or the like may be used. In a case where a touch panel is used as the input device 5161, the touch panel may be provided on the display surface of the display device 5155.

Alternatively, the input device 5161 is a device worn by a user, for example, a glasses-type wearable device, a head mounted display (HMD), or the like, and various types of input are performed according to a gesture or a line of sight of the user detected by these devices. Furthermore, the input device 5161 includes a camera capable of detecting a motion of a user, and various types of input are performed according to a gesture or a line-of-sight of the user detected from a video captured by the camera. Moreover, the input device 5161 includes a microphone capable of collecting voice of a user, and various types of input are performed by using the voice through the microphone. By configuring the input device 5161 to allow input of various types of information in a non-contact manner as described above, especially a user who belongs to a clean area (for example, the operator 5181) can operate a device belonging to an unclean area in a non-contact manner. Furthermore, a user can operate devices without taking his/her hand off operation tools in his/her hand, improving convenience for users.

A treatment tool control device 5163 controls driving of the energy treatment tool 5135 for cauterizing or dissecting of tissue, sealing a blood vessel, or the like. In order to secure the field of view of the endoscope 5115 and secure the working space for the operator, a pneumoperitoneum device 5165 feeds gas into a body cavity of the patient 5185 through the pneumoperitoneum tube 5133. A recorder 5167 is a device capable of recording various types of information regarding an operation. A printer 5169 is a device capable of printing various types of information regarding an operation in various formats such as a text, an image, a graph, and the like.

Hereinafter, particularly characteristic configuration of the endoscopic operation system 5113 will be described in more detail.

(Support Arm Device)

The support arm device 5141 includes the base portion 5143, which is a base, and the arm portion 5145, which extends from the base portion 5143. In the illustrated example, the arm portion 5145 includes a plurality of the joint portions 5147*a*, 5147*b*, and 5147*c*, and the plurality of links 5149*a* and 5149*b* connected by the joint portion 5147*b*, but the configuration of the arm portion 5145 is illustrated in a simplified manner in FIG. 14, for the sake of simplicity. In practice, a shape, the number, and an arrangement of the joint portions 5147a to 5147c and the links 5149a and 5149b, directions of rotation axe of the joint portions 5147a to 5147c, and the like may be set appropriately such that the arm portion 5145 has a desired degree of freedom. For example, the arm portion 5145 may be configured preferably such that the arm portion 5145 has a degree of freedom not less than 6 degrees of freedom. With this configuration, the endoscope 5115 can be freely moved in a movable range of the arm portion 5145. Thus, the lens barrel 5117 of the endoscope 5115 can be inserted into the body cavity of the patient 5185 from a desired direction.

The joint portions 5147a to 5147c are provided with actuators, and the joint portions 5147a to 5147c are configured to be rotatable around predetermined rotation axes by driving the actuators. The driving of the actuator is controlled by the arm control device 5159 to control the rotational angle of each of the joint portions 5147a to 5147c, thereby controlling driving of the arm portion 5145. Thus, control of the position and the posture of the endoscope 5115 can be realized. At this time, the arm control device 5159 can control driving of the arm portion 5145 by various known control methods such as force control or position control.

For example, the operator 5181 appropriately performs an operation input through the input device 5161 (including the foot switch 5171) so as to appropriately control the driving of the arm portion 5145 by the arm control device 5159 according to the operation input, and the position and the posture of the endoscope 5115 may be controlled. With this control, after the endoscope 5115 at the distal end of the arm portion 5145 is moved from a certain position to a certain position, the endoscope 5115 can be supported fixedly at the position after the movement. Note that, the arm portion 5145 may be operated in a so-called master-slave manner. In this case, the arm portion 5145 may be remotely controlled by a user through the input device 5161 provided at a place away from the operation room.

Furthermore, in a case where the force control is used, the arm control device 5159 may perform so-called power assist control, in which external force is received from a user and the actuator of each of the joint portions 5147a to 5147c is driven to move the arm portion 5145 smoothly according to the external force. With this control, when the user moves the arm portion 5145 while touching the arm portion 5145 directly, the arm portion 5145 can be moved with relatively weak force. Therefore, the endoscope 5115 can be moved more intuitively by a simpler operation, improving the convenience for users.

Here, in general, the endoscope 5115 has been supported by a surgeon called an endoscopic technician in the endoscopic operation. On the other hand, by using the support arm device 5141, the position of the endoscope 5115 can be more reliably fixed without manual operations. Therefore, the image of the operation site can be stably obtained, and operation can be smoothly performed.

Note that the arm control device 5159 is not necessarily provided on the cart 5151. Furthermore, the arm control device 5159 is not necessarily a single device. For example, the arm control device 5159 may be provided in each of the joint portions 5147a to 5147c of the arm portion 5145 of the support arm device 5141, and the plurality of arm control devices 5159 may cooperate with each other to realize the driving control of the arm portion 5145.

(Light Source Device)

The light source device 5157 supplies irradiation light used when capturing an image of an operation site to the endoscope 5115. The light source device 5157 includes a white light source, which includes, for example, an LED, a laser light source or a combination of them. In this case, in a case where a white light source includes a combination of red, green, and blue (RGB) laser light sources, the output intensity and the output timing can be controlled highly accurately for each color (each wavelength). Thus, the white balance of a captured image can be adjusted by the light source device 5157. Furthermore, in this case, in a case where laser beams from the RGB laser light sources are applied in time division to an observation target and driving of the imaging elements of the camera head 5119 is controlled in synchronism with the application timings of the laser beams, an image corresponding to each of the R, G, and B colors can be captured in time division. According to this method, a color image can be obtained without providing a color filter on each of the imaging elements.

Furthermore, the driving of the light source device 5157 may be controlled such that the intensity of output light is changed at predetermined time intervals. Driving of the imaging element of the camera head 5119 is controlled in synchronization with the timing of the change of the intensity of the light to obtain images in time division, and the images are combined, so that it is possible to generate a high-dynamic range image in which so-called halation and black defects do not exist.

Furthermore, the light source device 5157 may be configured to supply light of a predetermined wavelength band suitable for special light observation. In special light observation, for example, the wavelength dependency of absorption of light in a body tissue is utilized and light of a narrower wavelength band in comparison with irradiation light at the time of ordinary observation (namely, white light) is applied. In this way, so-called narrow band light observation (narrow band imaging) is performed, in which a predetermined tissue such as a blood vessel of a superficial portion of the mucous membrane or the like is imaged in a high contrast. Alternatively, in the special light observation, fluorescence observation may be performed, in which an image is obtained from fluorescence generated by applying excitation light. In fluorescent observation, fluorescent light from a body tissue by irradiating the body tissue with excitation light (autofluorescence observation) may be observed, or a fluorescent light image may be obtained by locally injecting a reagent such as indocyanine green (ICG) into a body tissue and irradiating the body tissue with excitation light corresponding to a fluorescent light wavelength of the reagent. The light source device 5157 can be configured such that the light source device 5157 can supply narrow band light and/or excitation light suitable for such special light observation.

(Camera Head and CCU)

Figure 15:
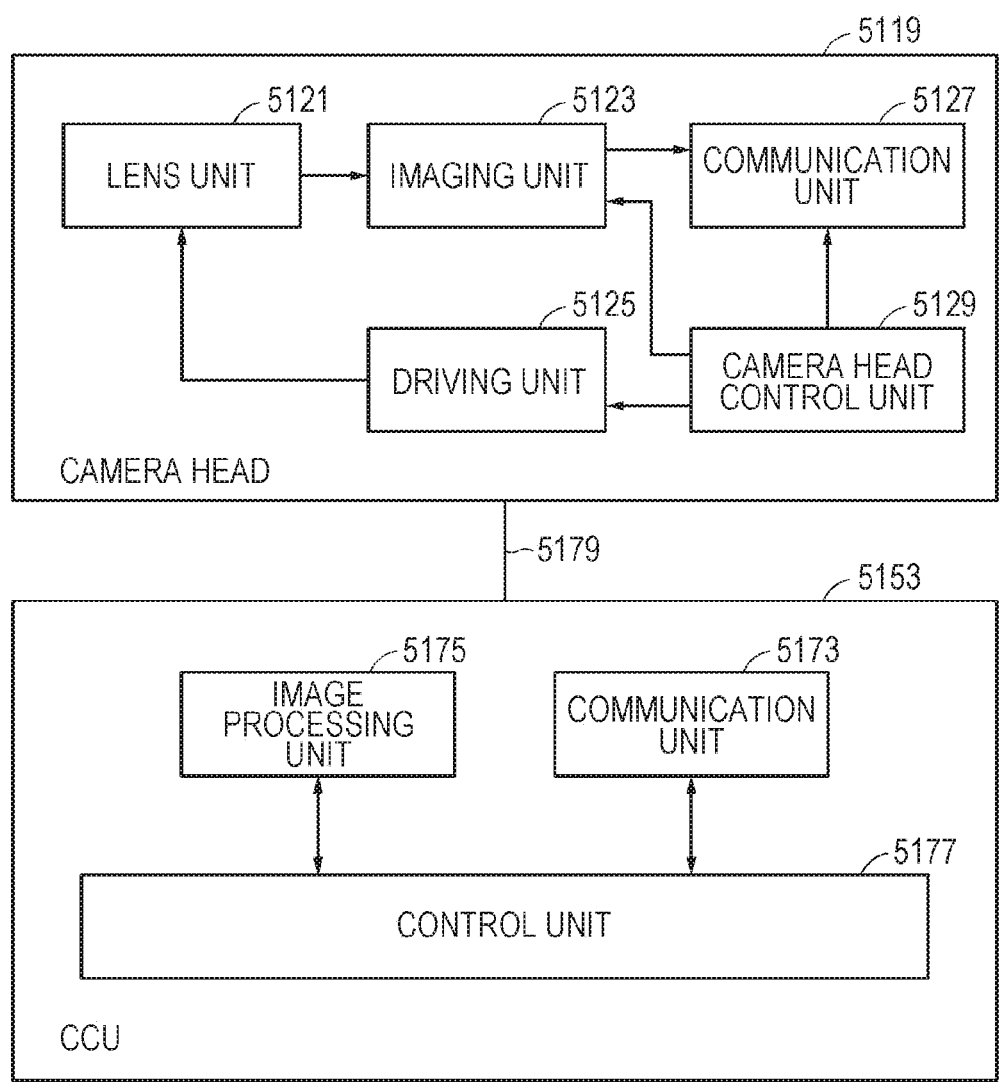
FIG. 15 is a block diagram illustrating an example of a functional configuration of a camera head and a CCU illustrated in FIG. 14.

Functions of the camera head 5119 and the CCU 5153 of the endoscope 5115 will be described in more detail with reference to FIG. 15. FIG. 15 is a block diagram illustrating an example of a functional configuration of the camera head 5119 and the CCU 5153 illustrated in FIG. 14.

Referring to FIG. 15, the camera head 5119 has a lens unit 5121, an imaging unit 5123, a driving unit 5125, a communication unit 5127, and a camera head control unit 5129 as functions thereof. Furthermore, the CCU 5153 has a communication unit 5173, an image processing unit 5175, and a control unit 5177 as functions thereof. The camera head 5119 and the CCU 5153 are connected communicably in both directions by a transmission cable 5179.

First, the functional configuration of the camera head 5119 will be described. The lens unit 5121 is an optical system provided at a connecting portion with the lens barrel 5117. Observation light taken in from a distal end of the lens barrel 5117 is guided to the camera head 5119 and enters the lens unit 5121. The lens unit 5121 includes a combination of a plurality of lenses including a zoom lens and a focus lens. The optical characteristic of the lens unit 5121 is adjusted such that the observation light is condensed on a light receiving surface of the imaging element of the imaging unit 5123. Furthermore, the zoom lens and the focusing lens are configured such that the positions thereof on their optical axis are movable for adjustment of the magnification and the focal point of a captured image.

The imaging unit 5123 includes the imaging element and is positioned at a subsequent stage of the lens unit 5121. Observation light having passed through the lens unit 5121 is condensed on the light receiving surface of the imaging element, and an image signal corresponding to the observation image is generated by photoelectric conversion. The image signal generated by the imaging unit 5123 is provided to the communication unit 5127.

As the imaging element, which is included in the imaging unit 5123, for example, an imaging element of the complementary metal oxide semiconductor (CMOS) type that has a Bayer array and is capable of capturing a color image may be used. Note that, as the imaging element, for example, an imaging element suitable for capturing an image of a high resolution not less than 4K may be used. Since an image of the operation site can be obtained with high resolution, the operator 5181 can grasp a state of the operation site in more detail, and can proceed the operation more smoothly.

Furthermore, the imaging element included in the imaging unit 5123 includes a pair of imaging elements, one of which is for obtaining an image signal for the right eye and the other one of which is for obtaining an image signal for the left eye corresponding to the 3D display. When 3D display is performed, the operator 5181 can grasp the depth of a living tissue in the operation site more accurately. Note that in a case where the imaging unit 5123 has a multi-plate type configuration, a plurality of lens units 5121 is provided corresponding to the imaging elements.

Furthermore, the imaging unit 5123 is not necessarily provided in the camera head 5119. For example, the imaging unit 5123 may be provided directly behind the objective lens in the lens barrel 5117.

The driving unit 5125 includes an actuator and moves the zoom lens and the focus lens of the lens unit 5121 by a predetermined distance along the optical axis under the control of the camera head control unit 5129. With this configuration, the magnification and the focal point of an image captured by the imaging unit 5123 may be appropriately adjusted.

The communication unit 5127 includes a communication device for transmitting and receiving various types of information to/from the CCU 5153. The communication unit 5127 transmits an image signal obtained from the imaging unit 5123 as RAW data to the CCU 5153 through the transmission cable 5179. At this time, in order to display a captured image of the operation site with low latency, the image signal is transmitted preferably by optical communication. This is because, at the time of operation, the operator 5181 performs operation while observing the state of an affected part through a captured image, and thus it is demanded for a moving image of the operation site to be displayed as close as real time as possible for safer and more reliable operation. In a case where optical communication is performed, a photoelectric conversion module for converting an electric signal into an optical signal is provided in the communication unit 5127. The image signal is converted into an optical signal by the photoelectric conversion module and then transmitted to the CCU 5153 through the transmission cable 5179.

Furthermore, the communication unit 5127 receives a control signal for controlling driving of the camera head 5119 from the CCU 5153. The control signal includes information regarding imaging conditions such as, for example, information indicating that a frame rate of a captured image is specified, information indicating that an exposure value at the time of image capturing is specified and/or information indicating that magnification and a focal point of a captured image are specified. The communication unit 5127 provides the received control signal to the camera head control unit 5129. Note that, the control signal from the CCU 5153 may also be transmitted by optical communication. In this case, a photoelectric conversion module that converts an optical signal into an electric signal is provided in the communication unit 5127, and the control signal is converted into an electric signal by the photoelectric conversion module and then provided to the camera head control unit 5129.

Note that the control unit 5177 of the CCU 5153 automatically sets the imaging conditions such as the frame rate, the exposure value, the magnification and the focal point described above on the basis of the obtained image signal. That is, the endoscope 5115 has a so-called Auto Exposure (AE) function, an Auto Focus (AF) function, and an Auto White Balance (AWB) function.

The camera head control unit 5129 controls driving of the camera head 5119 on the basis of the control signal from the CCU 5153 received through the communication unit 5127. For example, the camera head control unit 5129 controls driving of the imaging element of the imaging unit 5123 on the basis of information indicating that a frame rate of a captured image is specified and/or information indicating that an exposure value at the time of image capturing is specified. Furthermore, for example, the camera head control unit 5129 controls the driving unit 5125 to appropriately move the zoom lens and the focus lens of the lens unit 5121 on the basis of information indicating that magnification and a focal point of a captured image are specified. The camera head control unit 5129 may further have a function of storing information for identifying the lens barrel 5117 and the camera head 5119.

Note that, by arranging the components such as the lens unit 5121, the imaging unit 5123, and the like in a sealed structure having high airtightness and waterproofness, the camera head 5119 can have resistance to autoclave sterilization.

Next, the functional configuration of the CCU 5153 will be described. The communication unit 5173 includes a communication device for transmitting and receiving various types of information to and from the camera head 5119. The communication unit 5173 receives an image signal transmitted thereto from the camera head 5119 through the transmission cable 5179. At this time, the image signal may be transmitted preferably by optical communication as described above. In this case, the communication unit 5173 includes a photoelectric conversion module for converting an optical signal into an electric signal corresponding to the optical communication. The communication unit 5173 provides the image signal converted into the electric signal to the image processing unit 5175.

Furthermore, the communication unit 5173 transmits the control signal for controlling driving of the camera head 5119 to the camera head 5119. The control signal may also be transmitted by optical communication.

The image processing unit 5175 performs various image processes on the image signal, which is the RAW data transmitted from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Furthermore, the image processing unit 5175 performs a wave detection process on the image signal so as to achieve the AE, the AF, and the AWB.

The image processing unit 5175 includes a processor such as a CPU and a GPU, and the processor operates according to a predetermined program so that the above-described image processes and the wave detection process may be performed. Note that, in a case where the image processing unit 5175 includes a plurality of GPUs, the image processing unit 5175 appropriately divides information regarding the image signal and the plurality of GPUs perform image processes in parallel.

The control unit 5177 performs various types of control regarding capturing an image of the operation site by the endoscope 5115 and display of the captured image. For example, the control unit 5177 generates a control signal for controlling driving of the camera head 5119. At this time, in a case where imaging conditions are input by a user, the control unit 5177 generates a control signal on the basis of the input by the user. Alternatively, in a case where the endoscope 5115 has the AE function, the AF function, and the AWB function, the control unit 5177 appropriately calculates an optimum exposure value, a focal distance, and white balance according to the result of the wave detection process performed by the image processing unit 5175 and generates a control signal.

Furthermore, the control unit 5177 makes the display device 5155 display the image of the operation site on the basis of the image signal subjected to the image process by the image processing unit 5175. At this time, the control unit 5177 recognizes various objects in the operation site image using various image recognition technologies. For example, the control unit 5177 can recognize an operation tool such as forceps, a particular living body part, bleeding, mist when the energy treatment tool 5135 is used, and the like by detecting the shape of edges or a color of an object included in the operation site image. When the control unit 5177 makes the display device 5155 display an operation site image, the control unit 5177 uses the recognition result to make the display device 5155 display various types of operation support information in a superimposed manner on the operation site image. The operation support information is superimposed and displayed, and is presented to the operator 5181 so that the operator 5181 can proceed with the operation more safely and reliably.

The transmission cable 5179 for connecting the camera head 5119 and the CCU 5153 is an electric signal cable suitable for electric signal communication, an optical fiber suitable for optical communication, or a composite cable thereof.

Here, in the illustrated example, wired communication has been performed by using the transmission cable 5179. However, the camera head 5119 and the CCU 5153 may wirelessly communicate with each other. In a case where the camera head 5119 and the CCU 5153 wirelessly communicate with each other, there is no need to lay the transmission cable 5179 in the operation room. Therefore, a situation in which movement of medical staffs in the operation room is hindered by the transmission cable 5179 may be avoided.

An example of the operation room system 5100 to which the technology according to the present disclosure may be applied has been described above. Note that, although a case in which the medical system to which the operation room system 5100 is applied is the endoscopic operation system 5113 has been described here as an example, the configuration of the operation room system 5100 is not limited to that of the example described above. For example, the operation room system 5100 may be applied to a flexible endoscope system for examination and a microscope operation system instead of the endoscopic operation system 5113.

The technology according to the present disclosure can be used to transfer an image of an affected part captured during operation to a personal computer, a tablet terminal, a monitor, or the like in a separate room among the application examples described above. What is required in this example is only that a state of an affected part can be checked in an image. Thus, an original image that has a high resolution but has a large data size is not required, and thus image transfer may be performed at high speed using small images or medium images so that the efficiency of operation, research, etc. can be improved.

In addition to medical purposes, the technology may be used in a case, for example, where an image of a subject such as a model is captured, the image obtained by the image capturing is transferred to a personal computer or a tablet terminal at any time, and checked by staffs other than the cameraman. What is required in this case is only that the composition and the state of the subject can be checked at the time of image capturing. Thus, an original image that has a high resolution but has a large data size is not required, and thus image transfer may be performed at high speed using small images or medium images so that the efficiency of image capturing can be improved.

3. Modification Examples

The embodiment of the present technology has been specifically described above. However, the present technology is not limited to the above-described embodiment, and various variations based on technical ideas of the present technology are possible.

The present technology is not limited to images as described in the embodiment, and can be applied to any content data such as data of moving images and audio. In a case where the content is a moving image, the data size can be reduced by reducing the frame rate, reducing the bit rate, and thinning out the frame images included in the moving image in addition to reducing the resolution and reducing the image size. Furthermore, in a case where the content data is audio data, the data size can be reduced by reducing the bit rate, or using a compressed sound source such as MPEG-1 Audio Layer-3 (MP3).

The purpose of use of small images is not limited to thumbnail display. As long as the data size is smaller than those of the original image and the medium image, small images may be used for any purpose of use. Furthermore, the purpose of use of medium images is not limited to applications such as uploading to SNS, sending to friends, printing, and image processing. As long as the data size is smaller than that of the original image, medium images may be used for any purpose of use.

The first device is not limited to an imaging device such as a digital camera or a single-lens reflex camera, but may be any device that creates content, such as a smartphone, a voice recorder, a portable game machine having a camera function and/or a recording function, or a wearable terminal. The second device may be any device as long as the second device can upload content created by the first device to the Internet, perform a predetermined process, and perform other processes.

The present technology may have the following configurations.

(1)
An information processing device configured to perform a process of creating, on a basis of original content, at least a first content having a data size smaller than a data size of the original content and a second content having a data size smaller than the data size of the first content, and a process of transferring the original content, the first content, and/or the second content.

(2)
The information processing device according to (1), in which the first content is transferred after the second content is transferred.

(3)
The information processing device according to (2), in which the original content is transferred after the first content and the second content are transferred.

(4)
The information processing device according to any one of (1) to (3), in which in a case where meta information is added to the original content, the first content is transferred before the second content is transferred.

(5)
The information processing device according to (4), in which after the first content and the second content are transferred, the original content to which the meta information is added is transferred preferentially over original content other than the original content.

(6)
The information processing device according to (4), in which the content is an image, and the meta information is face detection information.

(7)
The information processing device according to (4), in which the content is an image, and the meta information is subject detection information.

(8)
The information processing device according to (4), in which the meta information is tag information added to the original content by a user.

(9)
The information processing device according to any one of (1) to (8), in which a transfer process is performed between a first device that creates or obtains the original content and one or more second devices.

(10)
The information processing device according to (9), in which in a case where a transfer bandwidth between the first device and the second devices becomes equal to or larger than a predetermined value, a process of transferring the original content and the first content is performed.

(11)
The information processing device according to (9), in which in a case where a transfer bandwidth between the first device and the second device becomes equal to or smaller than a predetermined value, a process of transferring the first content is performed.

(12)
The information processing device according to any one of (1) to (11), in which the content is an image captured by an imaging device.

(13)
The information processing device according to any one of (1) to (12), in which the data sizes of the first content and the second content are reduced by reducing resolutions to be lower than a resolution of the original content.

(14)
The information processing device according to any one of (1) to (13), in which the data sizes of the first content and the second content are reduced by reducing image sizes to be lower than an image size of the original content.

(15)
The information processing device according to (9), in which
the first device is an imaging device that obtains an original image as the original content by image-capturing, and
the second device is a terminal device connectable to the Internet.

(16)
An information processing method including:
creating, on a basis of original content, at least a first content having a data size smaller than a data size of the original content and a second content having a data size smaller than the data size of the first content; and
transferring the original content, the first content, and/or the second content.

(17)
An information processing program causing a computer to perform an information processing method including:
creating, on a basis of original content, at least a first content having a data size smaller than a data size of the original content and a second content having a data size smaller than the data size of the first content; and
transferring the original content, the first content, and/or the second content.

REFERENCE SIGNS LIST

100 Imaging device
200 Terminal device
120 Information processing unit

The invention claimed is:
1. An information processing device, comprising:
a central processing unit (CPU) configured to:
control generation of first content and second content of each of a first original content and a second original content, wherein
the first content of the first original content has a data size smaller than a data size of the first original content,
the second content of the first original content has a data size smaller than the data size of the first content of the first original content,
the first content of the second original content has a data size smaller than a data size of the second original content,
the second content of the second original content has a data size smaller than the data size of the first content of the second original content,
the first original content is different from the second original content,
the first original content includes first meta information, and second meta information of the second original content is absent in the second original content;
control transfer of the first content of the first original content before transfer of the second content of the first original content, wherein the first content of the first original content is transferred before the transfer of the second content of the first original content based on the first original content that includes the first meta information;
control the transfer of the second content of the first original content, that has the data size smaller than the data size of the first content of the first original content, after the transfer of the first content;
control transfer of the second content of the second original content before transfer of the first content of the second original content, wherein the second content of the second original content is transferred before the transfer of the first content of the second original content based on the absence of the second meta information in the second original content;
control the transfer of the first content of the second original content after the transfer of the second content of the second original content;
control transfer of the first original content after the transfer of the first content of the first original content and the transfer of the second content of the first original content; and
control transfer of the second original content after the transfer of the second content of the second original content and the transfer of the first content of the second original content.

2. The information processing device according to claim 1, wherein the CPU is further configured to control the transfer of the first original content, that includes the first meta information, before the transfer of the second original content.

3. The information processing device according to claim 1, wherein
the first original content is an image, and
the first meta information is face detection information.

4. The information processing device according to claim 1, wherein
the first original content is an image, and
the first meta information is subject detection information.

5. The information processing device according to claim 1, wherein the first meta information is tag information added to the first original content by a user operation.

6. The information processing device according to claim 1, wherein the first original content is transferred from a first device, that one of creates or obtains the first original content, to at least one second device.

7. The information processing device according to claim 1, wherein each of the first original content and the second original content is an image captured by an imaging device.

8. The information processing device according to claim 1, wherein the CPU is further configured to control reduction of a resolution of the first original content to generate the first content of the first original content and the second content of the first original content.

9. The information processing device according to claim 1, wherein the CPU is further configured to control reduction of an image size of the first original content to generate the first content of the first original content and the second content of the first original content.

10. The information processing device according to claim 6, wherein
the first device is an imaging device that obtains an original image as the first original content by an image-capturing operation, and
the at least one second device is a terminal device connectable to Internet.

11. The information processing device according to claim 6, wherein
the CPU is further configured to control the transfer of the first original content and the first content of the first original content based on a transfer bandwidth between the first device and the at least one second device, and
the transfer bandwidth is one of equal to or greater than a threshold value.

12. The information processing device according to claim 6, wherein
the CPU is further configured to control the transfer of the first content of the first original content based on a transfer bandwidth between the first device and the at least one second device, and
the transfer bandwidth is one of equal to or smaller than a threshold value.

13. An information processing method, comprising:
controlling generation of first content and second content of each of first original content and second original content, wherein
the first content of the first original content has a data size smaller than a data size of the first original content,
the second content of the first original content has a data size smaller than the data size of the first content of the first original content,
the first content of the second original content has a data size smaller than a data size of the second original content,
the second content of the second original content has a data size smaller than the data size of the first content of the second original content,
the first original content is different from the second original content,
the first original content includes first meta information, and
second meta information of the second original content is absent in the second original content;
controlling transfer of the first content of the first original content before transfer of the second content of the first original content, wherein the first content of the first original content is transferred before the transfer of the second content of the first original content based on the first original content that includes the first meta information;
controlling the transfer of the second content of the first original content, that has the data size smaller than the data size of the first content of the first original content, after the transfer of the first content of the first original content;
controlling transfer of the second content of the second original content before transfer of the first content of the second original content, wherein the second content of the second original content is transferred before the transfer of the first content of the second original content based on the absence of the second meta information in the second original content;
controlling the transfer of the first content of the second original content after the transfer of the second content of the second original content;

controlling transfer of the first original content after the transfer of the first content of the first original content and the transfer of the second content of the first original content; and controlling transfer of the second original content after the transfer of the second content of the second original content and the transfer of the first content of the second original content.

14. A non-transitory computer-readable medium having stored thereon, computer-executable instructions which, when executed by a processor, cause the processor to execute operations, the operations comprising:

controlling generation of first content and second content of each of first original content and second original content, wherein the first content of the first original content has a data size smaller than a data size of the first original content, the second content of the first original content has a data size smaller than the data size of the first content of the first original content, the first content of the second original content has a data size smaller than a data size of the second original content, the second content of the second original content has a data size smaller than the data size of the first content of the second original content, the first original content is different from the second original content, the first original content includes first meta information, and second meta information of the second original content is absent in the second original content;

controlling transfer of the first content of the first original content before transfer of the second content of the first original content, wherein the first content of the first original content is transferred before the transfer of the second content of the first original content based on the first original content that includes the first meta information;

controlling the transfer of the second content of the first original content, that has the data size smaller than the data size of the first content of the first original content, after the transfer of the first content of the first original content;

controlling transfer of the second content of the second original content before transfer of the first content of the second original content, wherein the second content of the second original content is transferred before the transfer of the first content of the second original content based on the absence of the second meta information in the second original content;

controlling the transfer of the first content of the second original content after the transfer of the second content of the second original content;

controlling transfer of the first original content after the transfer of the first content of the first original content and the transfer of the second content of the first original content; and controlling transfer of the second original content after the transfer of the second content of the second original content and the transfer of the first content of the second original content.

\* \* \* \* \*